United States Patent
Suzuki et al.

(10) Patent No.: US 12,176,712 B2
(45) Date of Patent: Dec. 24, 2024

(54) POWER MANAGEMENT SYSTEM, POWER DEMAND-SUPPLY MANAGEMENT APPARATUS, AND POWER DEMAND-SUPPLY MANAGEMENT METHOD

(71) Applicant: Hitachi, Ltd., Tokyo (JP)

(72) Inventors: Toshiaki Suzuki, Tokyo (JP); Yusuke Shomura, Tokyo (JP); Nao Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 438 days.

(21) Appl. No.: 17/526,019

(22) Filed: Nov. 15, 2021

(65) Prior Publication Data
US 2022/0166216 A1    May 26, 2022

(30) Foreign Application Priority Data
Nov. 20, 2020 (JP) .................. 2020-193608

(51) Int. Cl.
  G06F 3/048    (2013.01)
  H02J 3/00     (2006.01)
(52) U.S. Cl.
  CPC .............. *H02J 3/004* (2020.01); *H02J 3/003* (2020.01); *H02J 2300/20* (2020.01)
(58) Field of Classification Search
  CPC ........ H02J 3/004; H02J 3/003; H02J 2300/20; H02J 3/008; Y04S 50/10
  See application file for complete search history.

(56) References Cited

U.S. PATENT DOCUMENTS

| | | | | |
|---|---|---|---|---|
| 2009/0299537 | A1* | 12/2009 | Rea ........................ | G06Q 30/06 700/286 |
| 2011/0215640 | A1* | 9/2011 | Donnelly ................ | H02J 3/466 307/21 |
| 2013/0007458 | A1* | 1/2013 | Wakita ................... | G06Q 30/04 713/175 |
| 2020/0051186 | A1* | 2/2020 | Sarker ................... | G07F 15/003 |
| 2021/0098988 | A1* | 4/2021 | Gokhale ................. | H02J 3/381 |
| 2021/0224903 | A1* | 7/2021 | Mathiesen-Ohman ... | H04L 9/50 |

FOREIGN PATENT DOCUMENTS

| | | |
|---|---|---|
| JP | 2019-067250 A | 4/2019 |
| WO | 2019/141511 A1 | 7/2019 |

OTHER PUBLICATIONS

Japanese Office Action received in corresponding Japanese Application No. 2020-193608 dated Dec. 26, 2023.
Extended European Search Report dated Feb. 18, 2022, issued in corresponding European Patent Application No. 21203918.4.

* cited by examiner

Primary Examiner — Aleksey Olshannikov
(74) Attorney, Agent, or Firm — MATTINGLY & MALUR, PC

(57) ABSTRACT

A power management system, which manages a transaction of power generated based on renewable energy, includes: a power supply system capable of supplying power generated based on the renewable energy to a power demand system; and a power demand-supply management apparatus that manages demand and supply of the power. The power demand-supply management apparatus requests the power supply system to supply the power to the power demand system in a power generation time zone of the power, and issues, to the power demand system, a certificate that an amount of supplied power has been consumed in accordance with generation of the power.

12 Claims, 37 Drawing Sheets

FIG. 1B

■ POWER SUPPLY SITUATION

| POWER TYPE | SUPPLY DATE | PROVISION TIME | POWER | POWER AMOUNT |
|---|---|---|---|---|
| NORMAL POWER | APRIL 1, 2020 | 00:00 TO 24:00 | 500kW | 500kW × 24h |
| RENEWABLE POWER | APRIL 1, 2020 | 10:00 TO 15:00 | 100kW | 100kW × 5h |

■ CASE OF TIME WHERE THERE IS RENEWABLE POWER GENERATION

| | USE POWER | PRICE | CONTROL AND BLOCKCHAIN RECORD |
|---|---|---|---|
| 1 | NORMAL POWER | 15 YEN/kWh | SUPPLY FROM RENEWABLE POWER AND ISSUE AND HOLD RENEWABLE SOURCE CERTIFICATE |
| 2 | RENEWABLE POWER | 18 YEN/kWh | SUPPLY FROM RENEWABLE POWER AND ISSUE AND PROVIDE RENEWABLE SOURCE CERTIFICATE |
| 3 | SAME-TIME RENEWABLE POWER | 20 YEN/kWh | SUPPLY FROM RENEWABLE POWER AND ISSUE AND PROVIDE SAME-TIME RENEWABLE SOURCE CERTIFICATE |

■ CASE OF TIME WHERE THERE IS NO RENEWABLE POWER GENERATION

| # | USE POWER | PRICE | CONTROL AND BLOCKCHAIN RECORD |
|---|---|---|---|
| 4 | NORMAL POWER | 15 YEN/kWh | SUPPLY FROM NORMAL POWER |
| 5 | RENEWABLE POWER | 18 YEN/kWh | SUPPLY FROM NORMAL POWER AND PROVIDE HELD RENEWABLE SOURCE CERTIFICATE |
| 6 | SAME-TIME RENEWABLE POWER | 20 YEN/kWh | PROVISION IS NOT ALLOWED |

FIG. 2

| | 201 | 202 | 203 | 204 | 205 | 206 | 207 |
|---|---|---|---|---|---|---|---|
| | MANAGEMENT ID | SYSTEM ID | POWER TYPE | PROVISION DATE | PROVISION TIME | POWER [kW] | POWER AMOUNT [kWh] |
| 211 | R1 | 40 | NORMAL POWER | APRIL 1, 2020 | 00:00 - 23:59 | 500 | 12,000 |
| 212 | R2 | 50 | RENEWABLE POWER | APRIL 1, 2020 | 10:00 - 14:59 | 100 | 500 |

| MANAGEMENT ID 301 | PROVISION POWER 302 | PRICE 303 | PROVISION TIME 304 |
|---|---|---|---|
| P1 | NORMAL POWER | 15 YEN/kWh | 00:00 – 23:59 |
| P2 | RENEWABLE POWER | 18 YEN/kWh | 00:00 – 23:59 |
| P3 | SAME-TIME RENEWABLE POWER | 20 YEN/kWh | 10:00 – 14:59 |

SERVICE MENU

○ NORMAL POWER                : 15 YEN/kWh
   ○ RENEWABLE POWER             : 18 YEN/kWh
   ○ SAME-TIME RENEWABLE POWER   : 20 YEN/kWh
```

SERVICE MENU

○ NORMAL POWER       : 15 YEN/kWh
   ○ RENEWABLE POWER    : 18 YEN/kWh
```

FIG. 5

| | 501 | 502 | 503 | 504 | 505 | 506 |
|---|---|---|---|---|---|---|
| | MANAGEMENT ID | SYSTEM ID | POWER TYPE | REQUEST DATE | REQUEST TIME | POWER [kW] |
| 511 | D1 | 10 | NORMAL POWER | APRIL 1, 2020 | 10:25 | 60 |
| 512 | D2 | 10 | RENEWABLE POWER | APRIL 1, 2020 | 11:15 | 60 |
| 513 | D3 | 10 | SAME-TIME RENEWABLE POWER | APRIL 1, 2020 | 12:45 | 60 |

RENEWABLE SOURCE CERTIFICATE

| | | |
|---|---|---|
| RENEWABLE SOURCE CERTIFICATE ID: | X01 | 602 |
| DEMAND SYSTEM ID: | 10 | 603 |
| SUPPLY SYSTEM ID: | 50 | 604 |
| SUPPLY DATE: | APRIL 1, 2020 | 605 |
| RENEWABLE POWER AMOUNT: | 40 [kWh] | 606 |

SAME-TIME RENEWABLE SOURCE CERTIFICATE

| | | |
|---|---|---|
| SAME-TIME RENEWABLE SOURCE CERTIFICATE ID: | Z01 | 702 |
| DEMAND SYSTEM ID: | 10 | 703 |
| SUPPLY SYSTEM ID: | 50 | 704 |
| SUPPLY/DEMAND DATE AND TIME: | APRIL 1, 2020  12:45 TO 13:24 | 705 |
| SAME-TIME RENEWABLE POWER AMOUNT: | 40 [kWh] | 706 |

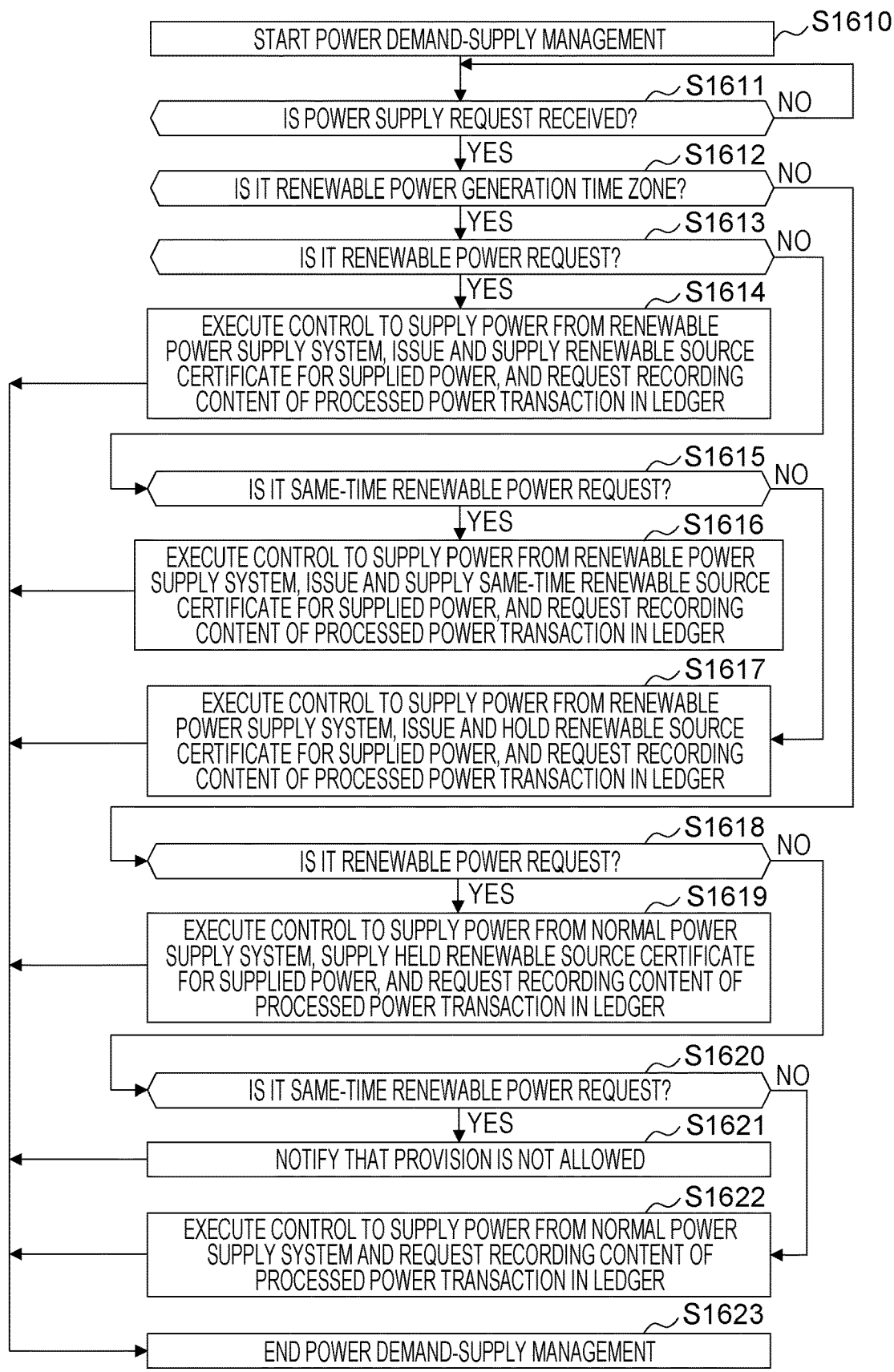

FIG. 17B

■ POWER SUPPLY SITUATION

| POWER TYPE | SUPPLY DATE | PROVISION TIME | POWER | POWER AMOUNT |
|---|---|---|---|---|
| NORMAL POWER | EVERYDAY | 00:00 TO 24:00 | 500kW | 500kW × 24h |
| RENEWABLE POWER | EVERYDAY | 10:00 TO 15:00 | 100kW | 100kW × 5h |

■ CASE OF TIME WHERE THERE IS RENEWABLE POWER GENERATION

| # | USE POWER | PRICE | CONTROL AND BLOCKCHAIN RECORD |
|---|---|---|---|
| 1 | NORMAL POWER | 15 YEN/kWh | SUPPLY FROM RENEWABLE POWER AND ISSUE AND HOLD RENEWABLE SOURCE CERTIFICATE |
| 2 | RENEWABLE POWER | 18 YEN/kWh | SUPPLY FROM RENEWABLE POWER AND ISSUE AND PROVIDE RENEWABLE SOURCE CERTIFICATE |
| 3 | SAME-TIME RENEWABLE POWER | 20 YEN/kWh | SUPPLY FROM RENEWABLE POWER AND ISSUE AND PROVIDE SAME-TIME RENEWABLE SOURCE CERTIFICATE |

■ CASE OF TIME WHERE THERE IS NO RENEWABLE POWER GENERATION

| | USE POWER | PRICE | CONTROL AND BLOCKCHAIN RECORD |
|---|---|---|---|
| 4 | NORMAL POWER | 15 YEN/kWh | SUPPLY FROM NORMAL POWER |
| 5 | RENEWABLE POWER | 18 YEN/kWh | SUPPLY FROM NORMAL POWER AND PROVIDE HELD RENEWABLE SOURCE CERTIFICATE |
| 6 | SAME-TIME RENEWABLE POWER | 20 YEN/kWh | SUPPLY FROM CHARGED RENEWABLE POWER AND PROVIDE SAME-TIME RENEWABLE SOURCE CERTIFICATE |

FIG. 18

| MANAGEMENT ID | SYSTEM ID | POWER TYPE | PROVISION DATE | PROVISION TIME | POWER [kW] | POWER AMOUNT [kWh] |
|---|---|---|---|---|---|---|
| R3 | 70 | RENEWABLE POWER | - | - | 100 | 1,000 |

FIG. 19

| | 501 | 502 | 503 | 504 | 505 | 506 | 507 |
|---|---|---|---|---|---|---|---|
| 520 → | MANAGEMENT ID | SYSTEM ID | POWER TYPE | REQUEST DATE | REQUEST TIME | POWER [kW] | CONTINUANCE TIME |
| 521 | D4 | 70 | SAME-TIME RENEWABLE POWER | APRIL 1, 2020 | 13:00 | 100 | 1 |
| 522 | D5 | 10 | SAME-TIME RENEWABLE POWER | APRIL 1, 2020 | 16:00 | 60 | - |

SAME-TIME RENEWABLE SOURCE CERTIFICATE

| | |
|---|---|
| SAME-TIME RENEWABLE SOURCE CERTIFICATE ID: | Z02-01  ~702 |
| DEMAND SYSTEM ID: | 10  ~703 |
| SUPPLY SYSTEM ID: | 70  ~704 |
| SUPPLY/DEMAND DATE AND TIME: | APRIL 1, 2020  16:00 TO 16:39  ~705 |
| SAME-TIME RENEWABLE POWER AMOUNT: | 40 [kWh]  ~706 |
| DIVISION POSSIBILITY: | IMPOSSIBLE  ~2750 |

2721

| TIME | SAME-TIME RENEWABLE POWER AMOUNT [kWh] |
|---|---|
| 16:00 – 16:04 | 5 |
| 16:05 – 16:09 | 5 |
| 16:10 – 16:14 | 5 |
| 16:15 – 16:19 | 5 |
| 16:20 – 16:24 | 5 |
| 16:25 – 16:29 | 5 |
| 16:30 – 16:34 | 5 |
| 16:35 – 16:39 | 5 |

SAME-TIME RENEWABLE SOURCE CERTIFICATE

| | | |
|---|---|---|
| SAME-TIME RENEWABLE SOURCE CERTIFICATE ID: | Z02-02 | ~702 |
| DEMAND SYSTEM ID: | 70 | ~703 |
| SUPPLY SYSTEM ID: | 50 | ~704 |
| SUPPLY/DEMAND DATE AND TIME: | APRIL 1, 2020  13:00 TO 13:59 | ~705 |
| SAME-TIME RENEWABLE POWER AMOUNT: | 60 [kWh] | ~706 |
| DIVISION POSSIBILITY: | POSSIBLE | ~2750 |

2731

| TIME | SAME-TIME RENEWABLE POWER AMOUNT [kWh] |
|---|---|
| 13:00 – 13:59 | 60 |

POWER MANAGEMENT SYSTEM, POWER DEMAND-SUPPLY MANAGEMENT APPARATUS, AND POWER DEMAND-SUPPLY MANAGEMENT METHOD

CROSS-REFERENCE TO RELATED APPLICATION

The present application claims priority from Japanese application JP 2020-193608, filed on Nov. 20, 2020, the contents of which is hereby incorporated by reference into this application.

BACKGROUND OF THE INVENTION

1. Field of the Invention

The present invention relates to a power management system, a power demand-supply management apparatus, and a power demand-supply management method for trading power generated based on renewable energy (hereinafter referred to as RE) such as solar power generation.

2. Description of the Related Art

In recent years, the use of RE has increased. In addition, by purchasing a certificate indicating power generation by RE, it has become possible to position that power (hereinafter, referred to as renewable power) generated by RE is used with respect to the consumed power.

In addition, there are known an environmental value transaction system, an environmental value transaction method, and an environmental value transaction program capable of promoting effective utilization of unused energy generated in a factory and activating a transaction of an obtained environmental value without intervention of a commercial power system (for example, JP 2019-67250 A).

SUMMARY OF THE INVENTION

However, a technique described in JP 2019-67250 A adopts a method of assigning the environmental value to the amount of power generated using exhaust heat of a factory but allowing a buyer to purchase a part or all thereof and consume power generated by a method different from the power generation using the exhaust heat in combination.

In this manner, when the buyer consumes the power generated by energy to which environmental value is not assigned in combination, it is difficult to calculate a usage amount of the power generated by the energy to which the environmental value can be assigned. Similarly, there is a problem that it is difficult to accurately calculate the environmental value even in a case where the buyer charges a charge/discharge apparatus with power and further supplies a part of the charged power to another apparatus to consume the charged power.

The present invention has been made in view of the above-described problems, and an object thereof is to provide a power management system capable of calculating an environmental value in order to encourage direct consumption of renewable power in the same time zone (hereinafter, referred to as the same-time renewable power) or substantive consumption in the same time zone by supplying the power to another apparatus while charging and discharging the renewable power.

The present invention for solving the above problems is a power management system that manages a transaction of power generated based on renewable energy, and includes: a power supply system capable of supplying power generated based on the renewable energy to a power demand system; and a power demand-supply management apparatus that manages demand and supply of the power. The power demand-supply management apparatus requests the power supply system to supply the power to the power demand system in a power generation time zone of the power, and issues, to the power demand system, a certificate that an amount of supplied power has been consumed in accordance with generation of the power.

According to the present invention, it is possible to provide the power management system that counts the environmental value for the power generated by RE and encourages the consumption in the same time zone.

BRIEF DESCRIPTION OF THE DRAWINGS

FIG. 2 is a table illustrating power supply capability application data in the power management system of FIG. 1A;

FIG. 3 is a table illustrating supply power price data in the power management system of FIG. 1A;

FIG. 4A is an example of a service provision screen in a power generation time zone based on renewable energy in the power management system of FIG. 1A;

FIG. 4B is an example of a service provision screen in a time zone in which power generated based on renewable energy is not possible in the power management system of FIG. 1A;

FIG. 5 is a table illustrating power purchase application data in the power management system of FIG. 1A;

FIG. 6 is a view illustrating a display screen of renewable source certificate data in the power management system of FIG. 1A;

FIG. 7 is a view illustrating a display screen of same-time renewable source certificate data in the power management system of FIG. 1A;

FIG. 16 is a flowchart illustrating a procedure of demand-supply management of the power demand-supply management apparatus in the power management system of FIG. 1A;

FIG. 17B is a table illustrating a power supply amount and a transaction unit price of each of normal power and renewable power as a power supply situation supplementing the power management system in FIG. 17A;

FIG. 18 is a table illustrating charge/discharge capability application data in the power management system of FIG. 17A;

FIG. 19 is a table illustrating charge control and power purchase application data in the power management system of FIG. 17A;

FIG. 27B is a view illustrating a display screen of same-time renewable source certificate data after division in the power demand-supply management apparatus according to the third embodiment;

FIG. 27C is a view illustrating a display screen of the same-time renewable source certificate data after division in the power demand-supply management apparatus according to the third embodiment;

DESCRIPTION OF THE PREFERRED EMBODIMENTS

Figure 1:
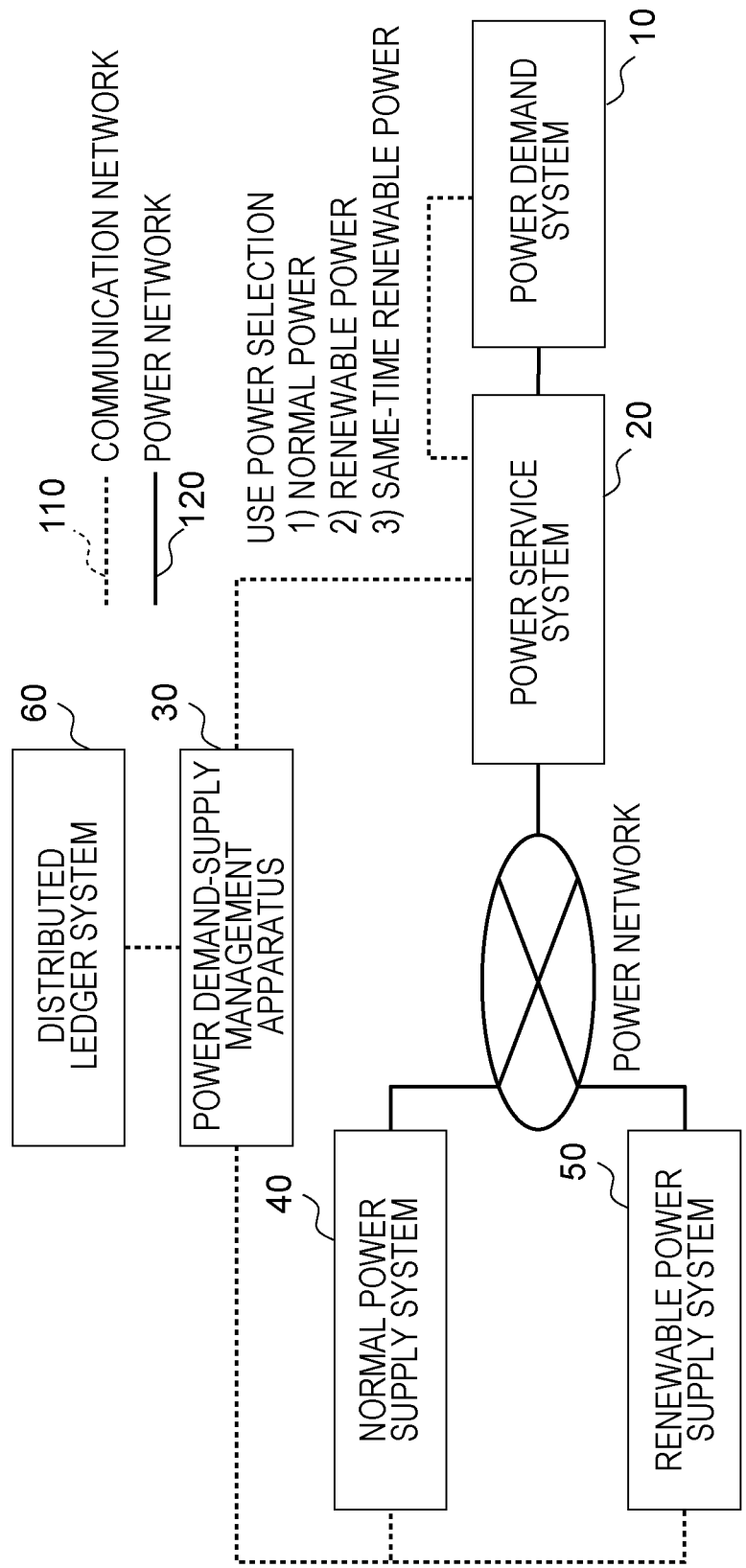
FIG. 1A is a functional block diagram illustrating a configuration of a power management system according to a first embodiment.
FIG. 1B is a table illustrating a power supply amount and a transaction unit price of each of normal power and renewable power as a power supply situation supplementing the power management system in FIG. 1A.

Embodiments will be described in detail with reference to the drawings. However, the present invention is not construed as being limited to the description of the embodiments described below. Those skilled in the art can easily understand that specific configurations can be changed without departing from the spirit or gist of the present invention.

Positions, sizes, shapes, ranges, and the like of the respective components illustrated in the drawings and the like do not always indicate actual positions, sizes, shapes, ranges and the like in order to facilitate understanding of the invention. Therefore, the present invention is not necessarily limited to the positions, sizes, shapes, ranges, and the like disclosed in the drawings and the like. Hereinafter, each of the embodiments of the present invention will be described with reference to FIGS. 1 to 33.

A first embodiment will be described with reference to FIGS. 1A to 16. A second embodiment will be described with reference to FIGS. 17A to 23B. A third embodiment will be described with reference to FIGS. 24 and 25. A fourth embodiment will be described with reference to FIGS. 28 to 30. A fifth embodiment will be described with reference to FIG. 31. A sixth embodiment will be described with reference to FIGS. 32 and 33.

First Embodiment

In the first embodiment, a case of consuming power generated by RE in the same time zone and a case of consuming power in different time zones are distinguished and managed, and renewable power supply and renewable source certificate assignment at different levels are performed. In the first embodiment, an operation of issuing a same-time renewable source certificate in accordance with supply of generated renewable power will be described when the supply of the generated renewable power is requested and consumed with reception in a time zone in which the renewable power can be generated. Hereinafter, a power demand-supply management operation in a power management system of FIG. 1A will be described with reference to FIGS. 1A to 16.

FIG. 1A is a functional block diagram illustrating a configuration of the power management system according to the first embodiment. As illustrated in FIG. 1, the power management system of the first embodiment includes a power demand system 10, a power service system 20, a power demand-supply management apparatus 30, a normal power supply system 40, a renewable power supply system 50, a distributed ledger system 60 that records a transaction of power, a communication network 110, and a power network 120. Note that a controller forming each part referred to as "XX system" includes a computer which will be described later with reference to FIG. 13.

The power demand system 10 is a buyer or a proxy function thereof capable of recognizing a change in a controllable load to consume power and expressing an intention to satisfy at least the demand. The power service system 20 is a mechanism that provides a power supply service in response to a request from the power demand system 10, and is a conventional power company, a power seller, or a proxy function thereof. The power demand-supply management apparatus 30 is a control function of managing the demand and supply of power, and compensates for a shortage and minimizes a surplus for saving. The normal power supply system 40 is a function of supplying generated power regardless of RE, and is mainly a thermal power plant using fossil fuel or a nuclear power plant.

The renewable power supply system 50 is a function of supplying power generated by RE, and is a power generation function mainly by sunlight, wind power, or the like in addition to a hydraulic power plant. The distributed ledger system 60 is a blockchain or the like that records a transaction of power. The blockchain refers to a mechanism in which a correct transaction can be performed even if there is a person who performs cheating or a person who does not normally operate among participants, tampering is extremely difficult, and the same data is held in a distributed manner by a large number of participants without stopping.

The communication network 110 connects the power demand system 10, the power service system 20, the power demand-supply management apparatus 30, the normal power supply system 40, the renewable power supply system 50, and the distributed ledger system 60 to exchange information. The power network 120 is a grid-connected power transmission network (transmission and distribution network), and connects the power demand system 10, the power service system 20, the normal power supply system 40, and the renewable power supply system 50.

The power management system illustrated in FIG. 1A is configured on the basis of an idea and equipment of a smart grid in which a power meter with a communication function (not illustrated) is disposed throughout the power management system, and power flow or the like is beneficially controlled using real-time information obtained from the power meter. The smart grid is a power transmission network that can control and optimize the flow of power from both sides of demand and supply. The smart grid is also called a next-generation power transmission network or a smart community in Japan.

The power demand system 10 notifies the power service system 20 of a type of required power, a required date, a required time, and power (kW) via the communication network 110 in order to obtain the required power. Here, the power demand system 10 can consume power selected from among normal power, renewable power, and same-time renewable power clearly indicating that power is consumed at the same time zone as power generation based on renewable energy.

The power service system 20 notifies the power demand-supply management apparatus 30 of a power request, requested from the power demand system, via the communication network 110. The power demand-supply management apparatus 30 performs control to supply normal power or renewable power to the normal power supply system 40 or the renewable power supply system 50 via the communication network 110 based on a power request from the power service system 20.

The normal power supply system 40 supplies normal power to the power demand system via the power network 120 and the power service system 20 in accordance with a request from the power demand-supply management apparatus 30. The renewable power supply system 50 supplies renewable power to the power demand system 10 via the power network 120 and the power service system 20 in accordance with a request from the power demand-supply management apparatus 30.

When requested power is renewable power, the power demand-supply management apparatus 30 provides a renewable source certificate to the power demand system 10, which is a power request source, via the communication network 110. In addition, when requested power is same-time renewable power, the power demand-supply management apparatus 30 provides a same-time renewable source certificate to the power demand system 10, which is a power request source, via the communication network 110.

Further, the power demand-supply management apparatus 30 records a transaction of demand and supply for power in the distributed ledger system 60 via the communication network 110. Note that the distributed ledger system 60 includes a plurality of data recording nodes, and each of the nodes records and holds power transaction data having the same content although not illustrated in the drawings. This distributed ledger system is constructed using, for example, a blockchain technology or the like.

FIG. 1B is a table illustrating a power supply amount and a transaction unit price of each of normal power and renewable power as a power supply situation supplementing the power management system in FIG. 1A. FIG. 2 is a table illustrating power supply capability application data in the power management system of FIG. 1A. Power supply capability application data 210 includes each field of a management identifier (ID) 201 for identifying each application, a system ID 202 for identifying a system that has transmitted an application, a power type 203 indicating power that can be provided, a provision date 204 indicating a date when power can be provided, provision time 205 indicating time at which power can be provided, providable power 206, and a providable power amount 207.

An application R1 illustrated in a row 211 indicates an application in which normal power can be provided from a system having a system ID of 40, and power of up to 500 kW and an amount of power of up to 12,000 kWh can be supplied from 00:00 to 23:59 on Apr. 1, 2020. In addition, an application R2 illustrated in a row 212 indicates an application in which renewable power can be provided from a system having a system ID of 50, and power of up to 100 kW and an amount of power of up to 500 kWh can be supplied from 10:00 to 14:59 on Apr. 1, 2020.

Note that the application in which power can be supplied by designating the provision date has been described in the first embodiment, but a provision period may be designated. In addition, the provision time has been described in units of minutes, but the provision time may be designated in units of hours, seconds, or other units.

FIG. 3 is a table illustrating supply power price data in the power management system of FIG. 1A. Supply power price data 310 includes each field of a management ID 301 for identifying a price for each power type, provision power 302 indicating a type of power to be provided, a price 303 indicating a price of provision power, and a provision time 304 at which the corresponding power can be supplied.

First price data P1 illustrated in a row 311 indicates that a type of power to be provided is normal power, a price is 15 yen/kWh, and provision time is from 00:00 to 23:59. Second price data P2 illustrated in a row 312 indicates that a type of power to be provided is renewable power, a price is 18 yen/kWh, and provision time is from 00:00 to 23:59.

In addition, third price data P3 illustrated in a row 313 indicates that a type of power to be provided is same-time renewable power, a price is 20 yen/kWh, and provision time is from 10:00 to 14:59. Note that a unit price per 1 kWh has been described as the price 303 in first embodiment, but other price specifications, such as a unit price per 1 Wh, may be used. In addition, the provision time has been described in units of minutes, the provision time may be designated in other units such as a time unit.

FIG. 4A is an example of a service provision screen in a power generation time zone based on renewable energy in the power management system of FIG. 1A. A service provision screen illustrated in FIG. 4A illustrates a screen presented to the power demand system 10 by the power service system 20 in a time zone (for example: 10:25 on Apr. 1, 2020) in which power generation based on renewable energy is possible. The first embodiment illustrates that three types of power provision services of normal power (15 yen/kWh), renewable power (18 yen/kWh), and same-time renewable power (20 yen/kWh) are possible in a time zone in which power generation based on renewable energy is possible.

FIG. 4B is an example of a service provision screen in a time zone in which power generation based on renewable energy is not possible in the power management system of FIG. 1A. A service provision screen illustrated in FIG. 4B illustrates a screen presented to the power demand system 10 by the power service system 20 in a time zone in which power generation based on renewable energy is not possible (for example: 15:40 on Apr. 1, 2020). The first embodiment illustrates that two types of power provision services of normal power (15 yen/kWh) and renewable power (18 yen/kWh) are possible in a time zone in which power generation based on renewable energy is not possible.

FIG. 5 is a table illustrating power purchase application data in the power management system of FIG. 1A. Power purchase application data 510 includes each field of a management ID 501 for identifying each application, a system ID 502 for identifying a system that has transmitted an application, a power type 503 indicating power desired to be purchased, a request date 504 indicating a date when power is required, a request time 505 indicating time at which power is required, and required power 506.

An application D1 illustrated in a row 511 indicates an application in which a power demand system having a system ID of 10 wishes to purchase normal power of 60 kW from 10:25 on Apr. 1, 2020. In addition, an application D2 illustrated in a row 512 indicates an application in which the power demand system having the system ID of 10 wishes to purchase renewable power of 60 kW from 11:15 on Apr. 1, 2020. Further, an application D3 illustrated in a row 513 indicates an application in which the power demand system having the system ID of 10 wishes to purchase same-time renewable power of 60 kW from 12:45 on Apr. 1, 2020.

FIG. 6 is a view illustrating a display screen of renewable source certificate data in the power management system of FIG. 1A. A renewable source certificate 600 includes each field of date and time 601 when a renewable source certificate has been issued, a renewable source certificate ID 602 for identifying each certificate, a system ID 603 for identifying a system that has consumed renewable power, a system ID 604 for identifying a system that has supplied renewable power, a supply date 605 indicating a date when renewable power has been supplied, and a renewable power amount 606 indicating an amount of supplied renewable power.

The first embodiment illustrates that the renewable source certificate has been issued at 11:55 on Apr. 1, 2020. In addition, illustrated is that the renewable source certificate ID is X01, the system ID of the system that has consumed renewable power is 10, the system ID of the system that has supplied the renewable power is 50, the supply date of the renewable power is Apr. 1, 2020, and the amount of the supplied renewable power is 40 kWh. Note that the supply date of the renewable power is designated in the first embodiment, but a period may be indicated.

FIG. 7 is a view illustrating a display screen of same-time renewable source certificate data in the power management system of FIG. 1A. A same-time renewable source certificate 700 (hereinafter, reference sign will be sometimes omitted) illustrated in FIG. 7 includes each field of date and time 701 when the certificate has been issued, a same-time renewable source certificate ID 702 for identifying each certificate, a system ID 703 for identifying a system that has consumed same-time renewable power, a system ID 704 for identifying a system that has supplied same-time renewable power, date and time 705 when same-time renewable power has been supplied and consumed, and a same-time renewable power amount 706 indicating an amount of the same-time renewable power.

The first embodiment illustrates that the same-time renewable source certificate has been issued at 13:25 on Apr. 1, 2020. In addition, illustrated is that the same-time renewable source certificate ID is Z01, the system ID of the system that has consumed the same-time renewable power is 10, the system ID of the system that has supplied the same-time renewable power is 50, the date and time when the same-time renewable power has been supplied and consumed is from 12:45 to 13:24 on Apr. 1, 2020, and the same-time renewable power amount related to the demand and supply of renewable power is 40 kWh.

Figure 8:
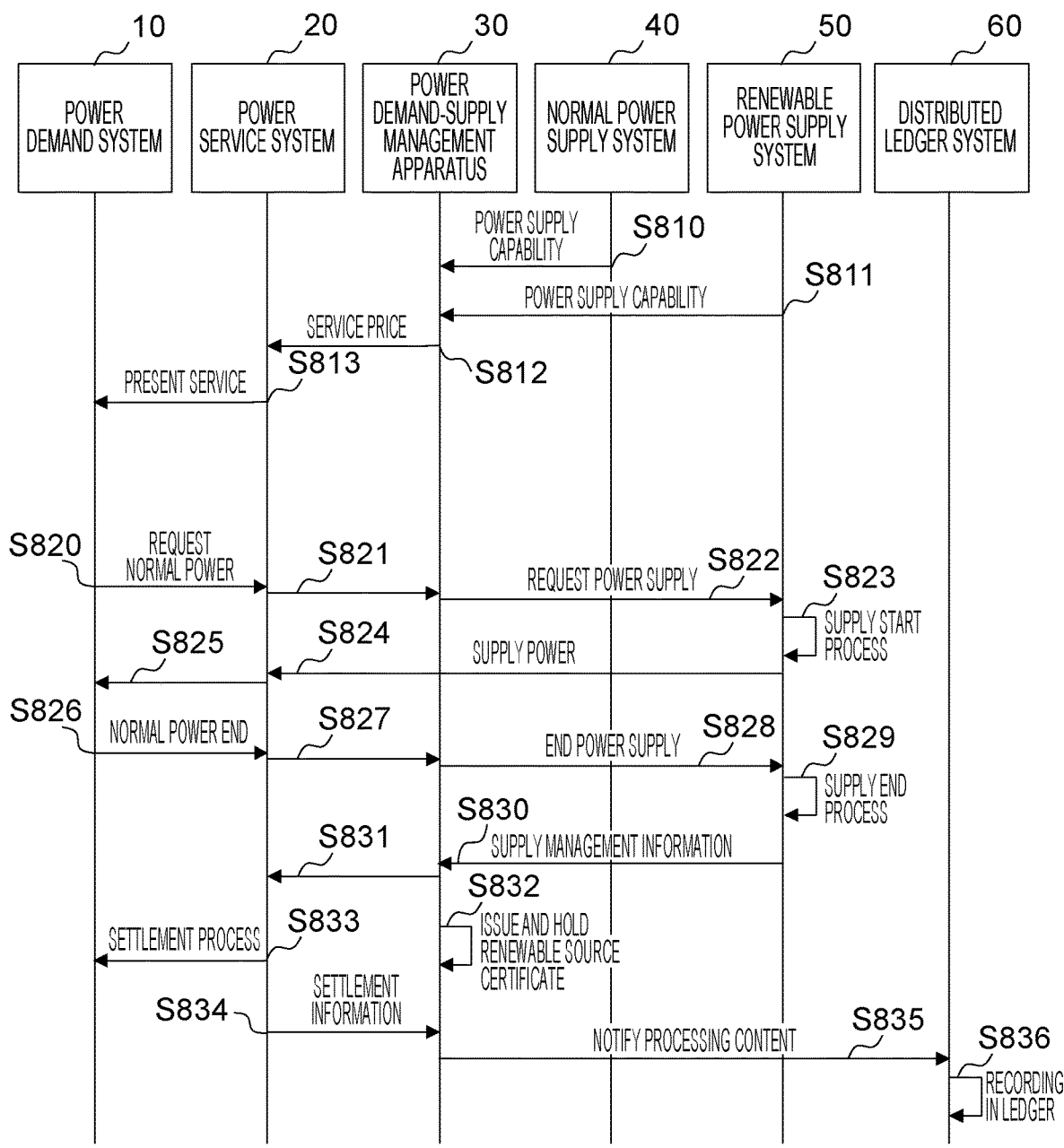
FIG. 8 is a sequence diagram illustrating normal power consumption during renewable power generation in the power management system of FIG. 1A.

FIG. 8 is a sequence diagram illustrating normal power consumption during renewable power generation in the power management system of FIG. 1A. This is an example of the sequence diagram of the normal power consumption during the renewable power generation in the power management system of FIG. 1A. First, the normal power supply system 40 notifies the power demand-supply management apparatus 30 of normal power that can be supplied (step S810). For example, a system ID, a power type, a provision date, a provision time, power, and a power amount illustrated in the row 211 of FIG. 2 are notified.

The renewable power supply system 50 notifies the power demand-supply management apparatus 30 of renewable power that can be supplied (step S811). For example, a system ID, a power type, a provision date, a provision time, power, and a power amount illustrated in the row 212 of FIG. 2 are notified. The power demand-supply management apparatus 30 notifies the power service system 20 of a type of power that can be supplied, a price, and time when power can be supplied (step S812). For example, the supply power price data illustrated in FIG. 3 is notified.

The power service system 20 presents a providable service to the power demand system 10 (step S813). For example, the screen illustrated in FIG. 4A or 4B is presented. After the above initial setting is completed, the power demand system 10 requests required power (normal power) from the power service system 20 (step S820). For example, normal power is requested using the power purchase application data illustrated in the row 511 of FIG. 5. The power service system 20 notifies the power demand-supply management apparatus 30 of the received normal power purchase application (step S821).

The power demand-supply management apparatus 30 confirms whether it is the time when the renewable power can be supplied, and controls the renewable power supply system 50 to supply the renewable power if confirming that it is the time zone in which the renewable power can be supplied (step S822). The renewable power supply system 50 executes a renewable power supply start process in accordance with a received power supply request (step S823). For example, control is performed to supply the renewable power to the power network, and the power supply start time is recorded.

In addition, the renewable power supply system 50 starts supplying the renewable power to the power service system 20 in accordance with the received power supply request (step S824). The power service system 20 supplies the supplied renewable power as normal power to the power demand system 10 (step S825). Subsequently, when the necessary normal power is purchased, the power demand system 10 notifies the power service system 20 of the purchase end (step S826). The power service system 20 notifies the power demand-supply management apparatus 30 of received purchase end information (step S827).

The power demand-supply management apparatus 30 controls the renewable power supply system 50 to stop the power supply based on the received purchase end information (step S828). The renewable power supply system 50 performs control to stop supplying the renewable power, and calculates the time when the supply is stopped and the amount of supplied power (step S829). Subsequently, the renewable power supply system 50 notifies the power demand-supply management apparatus 30 of the supply start time and end time of the renewable power and the amount of supplied power (step S830). The power demand-supply management apparatus 30 notifies the power service system 20 of the amount of supplied power (step S831).

In addition, the power demand-supply management apparatus 30 issues and holds a renewable source certificate in which a system ID having consumed power with the renewable source certificate, described with reference to FIG. 6, is not determined, for the amount of supplied power (step S832). Note that such a renewable source certificate in which the system ID that has consumed power is not determined is supplied in accordance with normal power, and thus, is used in a case where the normal power is supplied as renewable power in a situation where the power generation based on renewable energy is not performed.

The power service system 20 executes a settlement process for the normal power supplied to the power demand system 10 (step S833). In addition, the power service system 20 notifies the power demand-supply management apparatus 30 that the settlement process for the normal power supplied to the power demand system 10 has been completed (step S834). The power demand-supply management apparatus 30 notifies the distributed ledger system 60 of a supply transaction content of the normal power (step S835).

The distributed ledger system 60 records the received transaction content (step S836). As the content to be recorded, for example, it is recorded that normal power of 40 kWh has been supplied from 10:25 to 11:04 on Apr. 1, 2020 to a power demand system having a system ID of 10 at a price of 600 yen.

Figure 9:
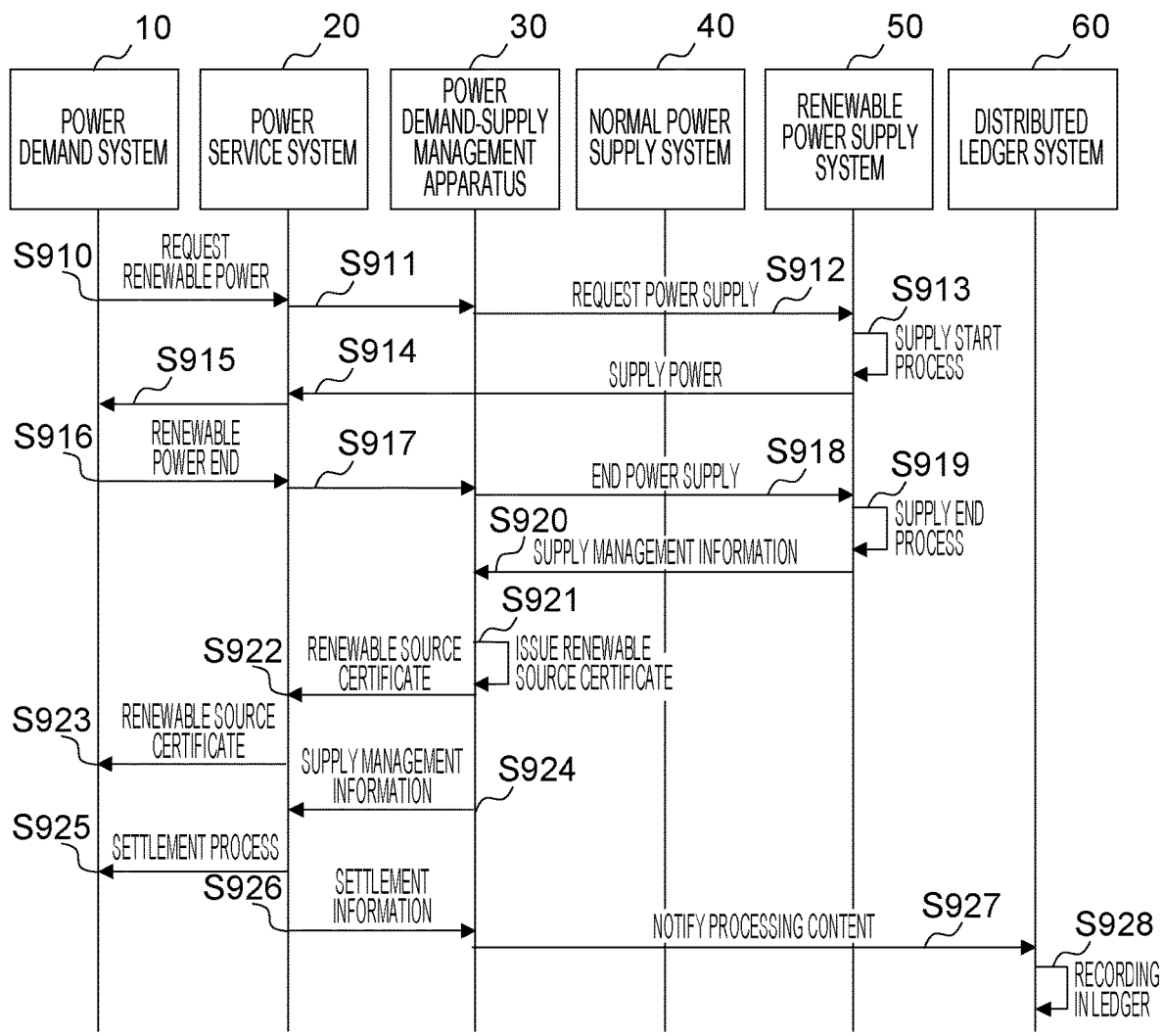
FIG. 9 is a sequence diagram illustrating renewable power consumption during renewable power generation in the power management system of FIG. 1A.

FIG. 9 is a sequence diagram illustrating renewable power consumption during renewable power generation in the power management system of FIG. 1A. The power demand system 10 requests required power from the power service system 20 (renewable power) (step S910). For example, renewable power is requested using the power purchase application data illustrated in the row 512 of FIG. 5. The power service system 20 notifies the power demand-supply management apparatus 30 of the received renewable power purchase application (step S911).

The power demand-supply management apparatus 30 confirms whether it is the time when the renewable power can be supplied, and controls the renewable power supply system 50 to supply the renewable power if confirming that it is the time zone in which the renewable power can be supplied (step S912). The renewable power supply system 50 executes a renewable power supply start process in accordance with a received power supply request (step S913). For example, control is performed to supply the renewable power to the power network, and the renewable power supply start time is recorded.

In addition, the renewable power supply system 50 starts supplying the renewable power to the power service system 20 in accordance with the received renewable power supply request (step S914). The power service system 20 supplies the supplied renewable power to the power demand system 10 (step S915). Subsequently, when the necessary renewable power is purchased, the power demand system 10 notifies the power service system 20 of the purchase end (step S916). The power service system 20 notifies the power demand-supply management apparatus 30 of received purchase end information (step S917).

The power demand-supply management apparatus 30 controls the renewable power supply system 50 to stop the renewable power supply based on the received purchase end information (step S918). The renewable power supply system 50 performs control to stop supplying the renewable power, and calculates the time when the supply is stopped and the amount of supplied power (step S919).

Subsequently, the renewable power supply system 50 notifies the power demand-supply management apparatus 30 of the supply start time and end time of the renewable power and the amount of supplied power (step S920). The power demand-supply management apparatus 30 issues a renewable source certificate corresponding to the amount of supplied renewable power (step S921), and notifies the power service system 20 of such renewable source certificate data (step S922).

The power service system 20 notifies the power demand system 10 of the received renewable source certificate data (step S923). The power demand-supply management apparatus 30 notifies the power service system 20 of the amount of supplied renewable power (step S924). The power service system 20 executes a settlement process for the renewable power supplied to the power demand system (step S925).

In addition, the power service system 20 notifies the power demand-supply management apparatus 30 that the settlement process for the renewable power supplied to the power demand system 10 has been completed (step S926).

The power demand-supply management apparatus 30 notifies the distributed ledger system 60 of a supply transaction content of the renewable power (step S927). The distributed ledger system 60 records the received transaction content (step S928). As the content to be recorded, for example, it is recorded that a power demand system having a system ID of 10 is supplied with renewable power of 40 kWh from 11:15 to 11:54 on Apr. 1, 2020 at a price of 720 yen with a renewable source certificate.

Figure 10:
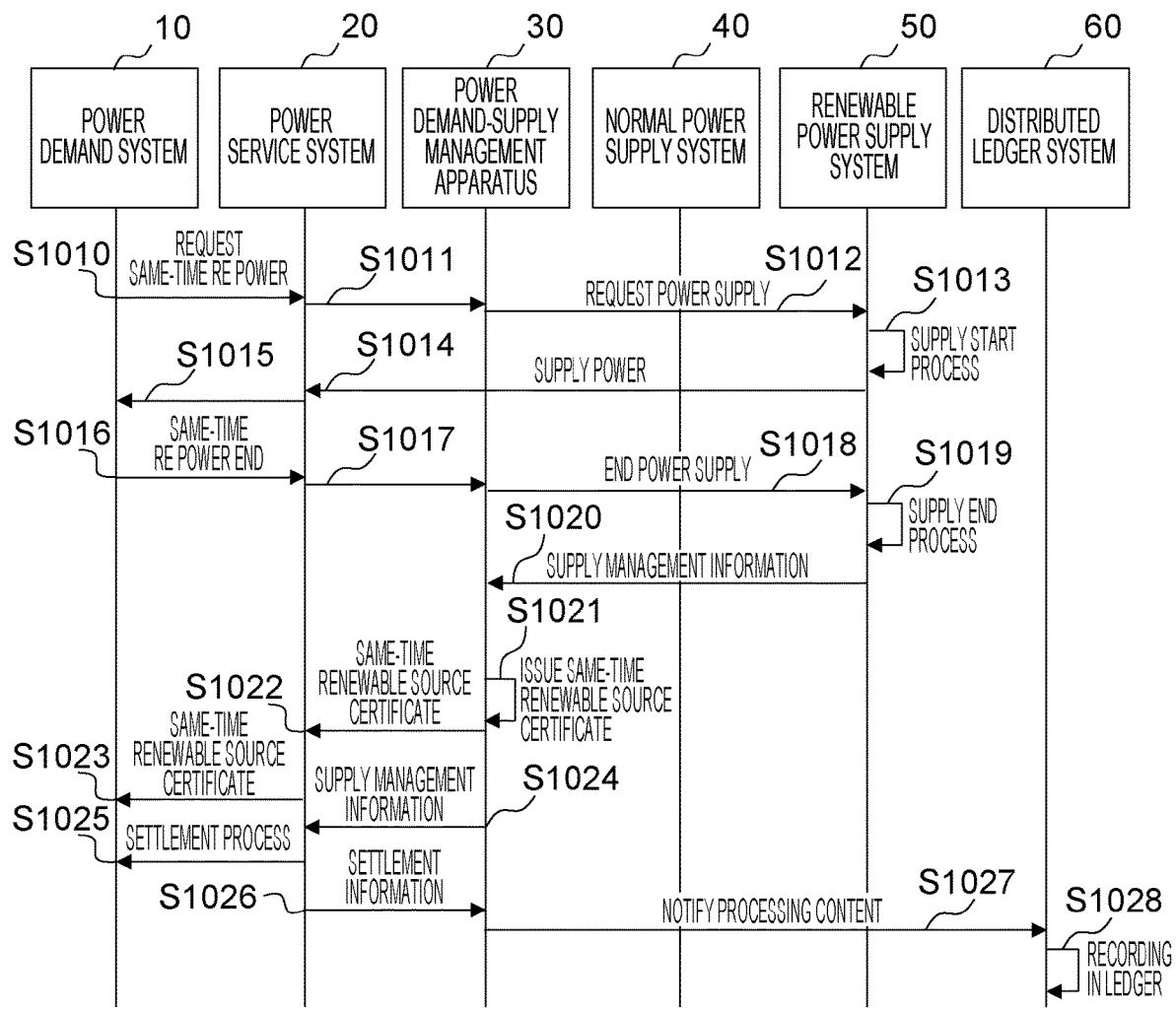
FIG. 10 is a sequence diagram illustrating same-time renewable power consumption during renewable power generation in the power management system of FIG. 1A.

FIG. 10 is a sequence diagram illustrating same-time renewable power consumption during renewable power generation in the power management system of FIG. 1A. The power demand system 10 requests required power (same-time renewable power) from the power service system 20 (step S1010). For example, same-time renewable power is requested using the power purchase application data illustrated in the row 513 of FIG. 5. The power service system 20 notifies the power demand-supply management apparatus 30 of the received same-time renewable power purchase application (step S1011).

The power demand-supply management apparatus 30 confirms whether it is the time when the renewable power can be supplied, and controls the renewable power supply system 50 to supply the renewable power if confirming that it is the time zone in which the renewable power can be supplied (step S1012). The renewable power supply system 50 executes a renewable power supply start process in accordance with a received power supply request (step S1013). For example, control is performed to supply the renewable power to the power network, and the renewable power supply start time is recorded.

In addition, the renewable power supply system 50 starts supplying the renewable power to the power service system 20 in accordance with the received renewable power supply request (step S1014). The power service system 20 supplies the power demand system 10 with the supplied renewable power as same-time renewable power (step S1015). Subsequently, when the necessary same-time renewable power is purchased, the power demand system 10 notifies the power service system 20 of the purchase end (step S1016).

The power service system 20 notifies the power demand-supply management apparatus 30 of received purchase end information (step S1017). The power demand-supply management apparatus 30 controls the renewable power supply system 50 to stop the renewable power supply based on the received purchase end information (step S1018). The renewable power supply system 50 performs control to stop supplying the renewable power, and calculates the time when the supply is stopped and the amount of supplied power (step S1019).

Subsequently, the renewable power supply system 50 notifies the power demand-supply management apparatus 30 of the supply start time and end time of the renewable power and the amount of supplied power (step S1020). The power demand-supply management apparatus 30 issues the same-time renewable source certificate (see FIG. 7) corresponding to the amount of supplied same-time renewable power (step S1021), and notifies the power service system 20 of such same-time renewable source certificate data (step S1022).

The power service system 20 notifies the power demand system 10 of the received same-time renewable source certificate data (step S1023). The power demand-supply management apparatus 30 notifies the power service system 20 of the amount of supplied same-time renewable power (step S1024). The power service system 20 executes a settlement process for the same-time renewable power supplied to the power demand system 10 (step S1025).

In addition, the power service system 20 notifies the power demand-supply management apparatus 30 that the settlement process for the same-time renewable power supplied to the power demand system 10 has been completed (step S1026). The power demand-supply management apparatus 30 notifies the distributed ledger system 60 of a supply transaction content of the same-time renewable power (step S1027).

The distributed ledger system 60 records the received transaction content (step S1028). As the content to be recorded, for example, it is recorded that provided power is same-time renewable power, a system ID of a system which has consumed the same-time renewable power is 10, a system ID of a system which has supplied the same-time renewable power is 50, date and time when the same-time renewable power has been supplied is from 12:45 to 13:24 on Apr. 1, 2020, the amount of supplied same-time renewable power is 40 kWh, a price is 800 yen, and a same-time renewable source certificate has been assigned.

Figure 11:
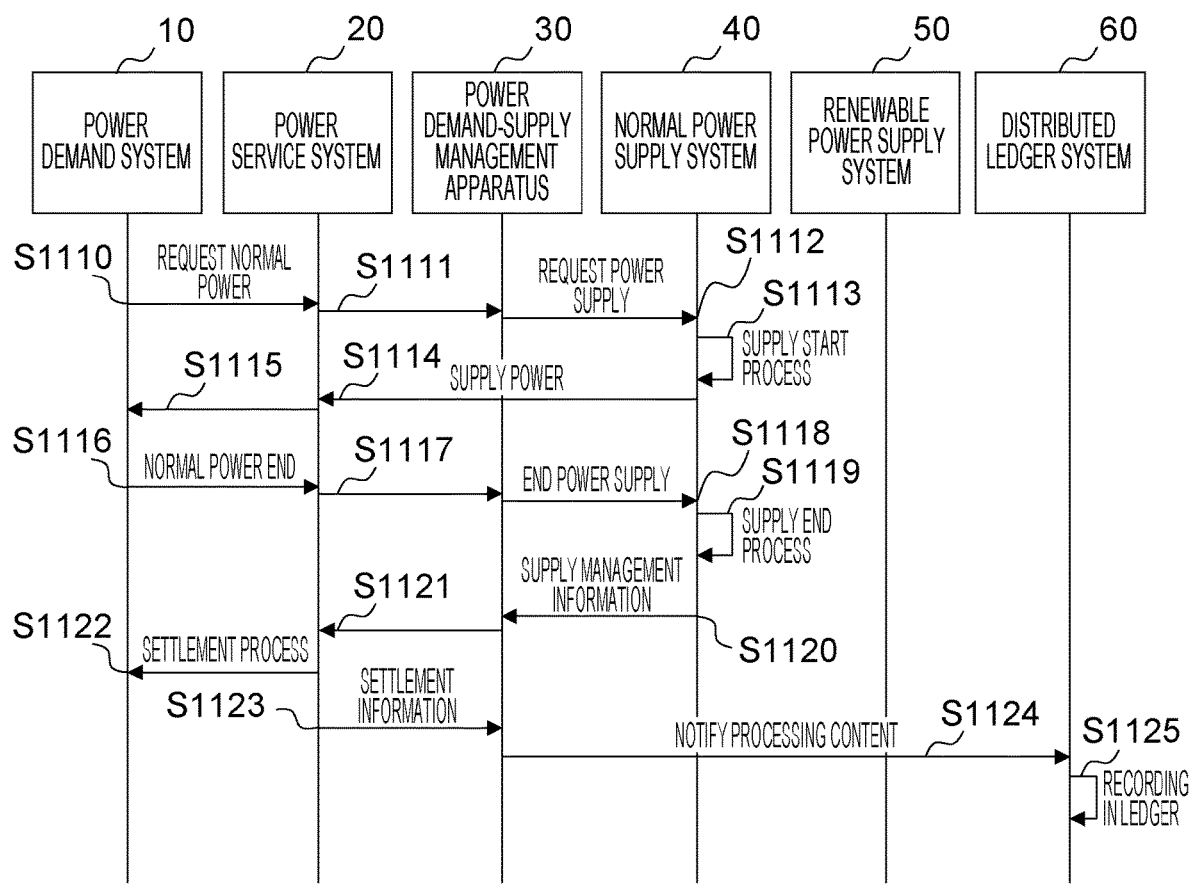
FIG. 11 is a sequence diagram illustrating normal power consumption during non-generation of renewable power in the power management system of FIG. 1A.

FIG. 11 is a sequence diagram illustrating normal power consumption during non-generation of renewable power in the power management system of FIG. 1A. The power demand system 10 requests required power (normal power) from the power service system 20 (step S1110). The power service system 20 notifies the power demand-supply management apparatus 30 of the received normal power purchase application (step S1111).

The power demand-supply management apparatus 30 confirms whether it is the time when the renewable power can be supplied, and controls the normal power supply system 40 to supply the normal power if confirming that it is a time zone in which the renewable power supply is not possible (step S1112).

The normal power supply system 40 executes a normal power supply start process in accordance with a received power supply request (step S1113). For example, control is performed to supply the normal power to the power network, and the power supply start time is recorded. In addition, the normal power supply system 40 starts supplying the normal power to the power service system 20 in accordance with the received power supply request (step S1114).

The power service system 20 supplies the supplied normal power to the power demand system 10 (step S1115). Subsequently, when the necessary normal power is purchased, the power demand system 10 notifies the power service system 20 of the purchase end (step S1116). The power service system 20 notifies the power demand-supply management apparatus 30 of received purchase end information (step S1117).

The power demand-supply management apparatus 30 controls the normal power supply system 40 to stop the power supply based on the received purchase end information (step S1118). The normal power supply system 40 performs control to stop supplying the normal power, and calculates the time when the supply is stopped and the amount of supplied power (step S1119).

Subsequently, the normal power supply system 40 notifies the power demand-supply management apparatus 30 of the supply start time and end time of the normal power and the amount of supplied power (step S1120). The power demand-supply management apparatus 30 notifies the power service system 20 of the amount of supplied power (step S1121). The power service system 20 executes a settlement process for the normal power supplied to the power demand system 10 (step S1122).

In addition, the power service system 20 notifies the power demand-supply management apparatus 30 that the settlement process for the normal power supplied to the power demand system 10 has been completed (step S1123). The power demand-supply management apparatus 30 notifies the distributed ledger system 60 of a supply transaction content of the normal power (step S1124). The distributed ledger system 60 records the received transaction content (step S1125). As the content to be recorded, for example, it is recorded that normal power of 40 kWh has been supplied from 10:25 to 11:04 on Apr. 1, 2020 to a power demand system having a system ID of 10 at a price of 600 yen.

Figure 12:
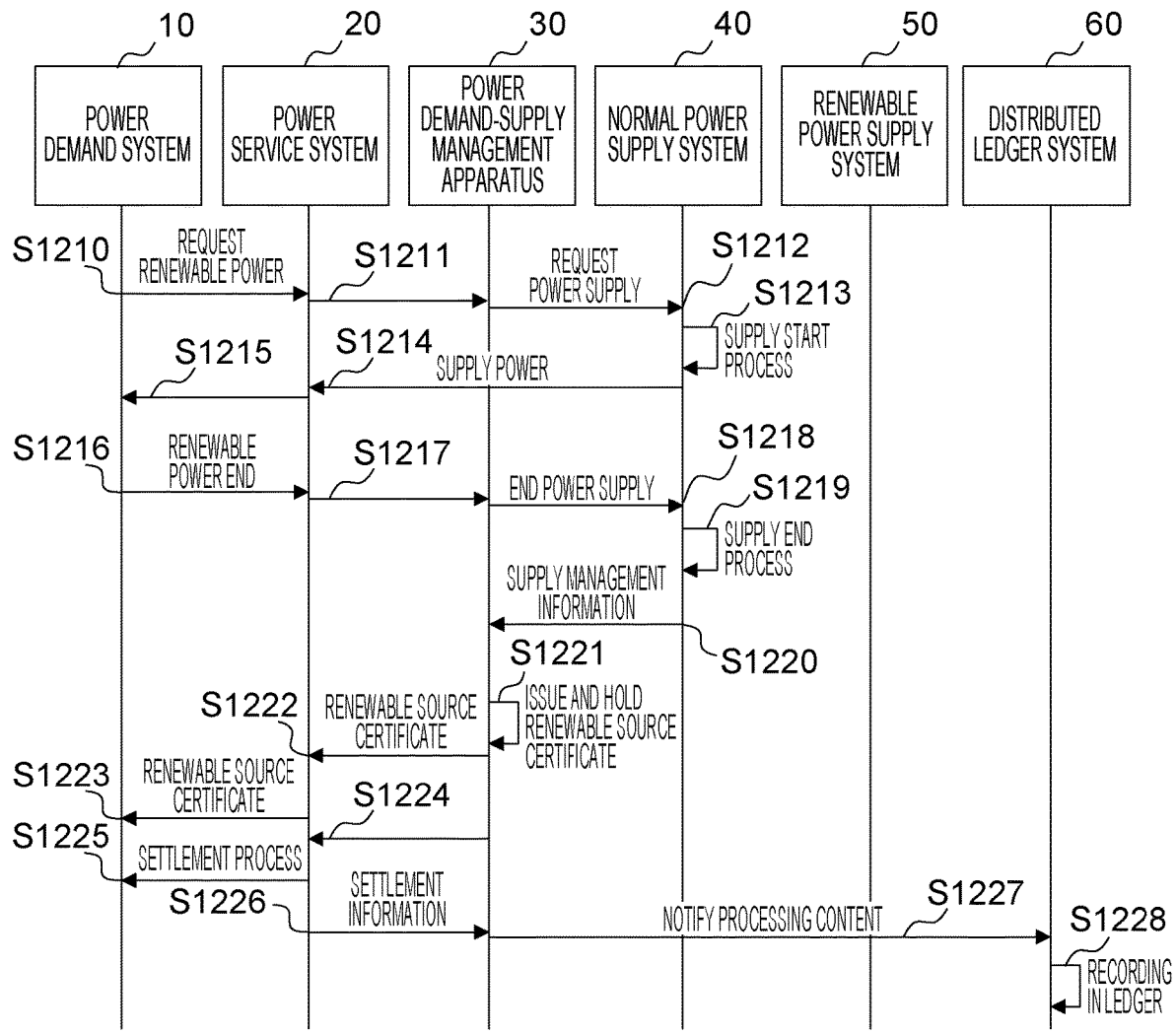
FIG. 12 is a sequence diagram illustrating renewable power consumption during non-generation of renewable power in the power management system of FIG. 1A.

FIG. 12 is a sequence diagram illustrating renewable power consumption during non-generation of renewable power in the power management system of FIG. 1A. The power demand system 10 requests required power (renewable power) from the power service system 20 (step S1210). The power service system 20 notifies the power demand-supply management apparatus 30 of the received renewable power purchase application (step S1211).

The power demand-supply management apparatus 30 confirms whether it is the time when the renewable power can be supplied, and controls the normal power supply system 40 to supply the normal power if confirming that it is a time zone in which the renewable power supply is not possible (step S1212).

The normal power supply system 40 executes a normal power supply start process in accordance with a received power supply request (step S1213). For example, control is performed to supply the normal power to the power network, and the normal power supply start time is recorded.

In addition, the normal power supply system 40 starts supplying the normal power to the power service system 20 in accordance with the received normal power supply request (step S1214). The power service system 20 supplies the supplied normal power to the power demand system 10 as renewable power (step S1215).

Subsequently, when the necessary renewable power is purchased, the power demand system 10 notifies the power service system 20 of the purchase end (step S1216). The power service system 20 notifies the power demand-supply management apparatus 30 of received purchase end information (step S1217).

The power demand-supply management apparatus 30 controls the normal power supply system 40 to stop the normal power supply based on the received purchase end information (step S1218). The normal power supply system 40 performs control to stop supplying the normal power, and calculates the time when the supply is stopped and the amount of supplied power (step S1219).

Subsequently, the normal power supply system 40 notifies the power demand-supply management apparatus 30 of the supply start time and end time of the normal power and the amount of supplied power (step S1220). The power demand-supply management apparatus 30 writes and issues a system ID of a system that has consumed power in the held renewable source certificate in response to the amount of supplied normal power (step S1221), and notifies the power service system 20 of such renewable source certificate data (step S1222).

The power service system 20 notifies the power demand system 10 of the received renewable source certificate data (step S1223). The power demand-supply management apparatus 30 notifies the power service system 20 of the amount of supplied renewable power (step S1224). The power service system 20 executes a settlement process for the renewable power supplied to the power demand system (step S1225).

In addition, the power service system 20 notifies the power demand-supply management apparatus 30 that the settlement process for the renewable power supplied to the power demand system 10 has been completed (step S1226). The power demand-supply management apparatus 30 notifies the distributed ledger system 60 of a supply transaction content of the renewable power (step S1227).

The distributed ledger system 60 records the received transaction content (step S1228). As the content to be recorded, for example, it is recorded that a power demand system having a system ID of 10 is supplied with renewable power of 40 kWh from 11:15 to 11:54 on Apr. 1, 2020 at a price of 720 yen with a renewable source certificate.

Figure 13:
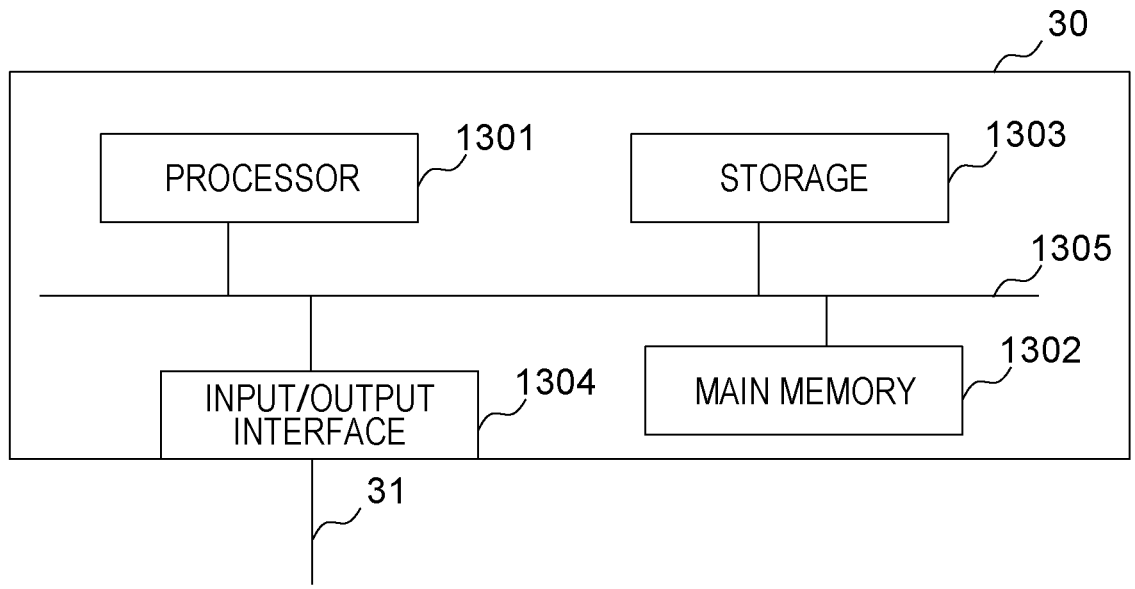
FIG. 13 is a functional block diagram illustrating a configuration of a power demand-supply management apparatus in the power management system of FIG. 1A.

FIG. 13 is a functional block diagram illustrating a configuration of the power demand-supply management apparatus 30 in the power management system of FIG. 1A. The power demand-supply management apparatus 30 includes a controller configured by a computer including a CPU 1301 which is a processor (processing device), a main memory 1302 which is a storage device, a storage 1303, and an input/output interface 1304 which transmits and receives data through a communication network (31). The respective components of the controller are connected to each other via a bus 1305. Further, an input/output device (not illustrated), for example, a keyboard or an image display device may be provided. Note that a part referred to as "XX system" is provided with a computer in a controller forming each part without being limited to the power demand-supply management apparatus 30.

The CPU 1301 controls each unit of the power demand-supply management apparatus 30, loads a program stored in the storage 1303 onto the main memory 1302 and executes the program, thereby executing various functions of the power demand-supply management apparatus 30. The main memory 1302 stores a power demand-supply initial setting program and a power demand-supply management program executed by the CPU 1301, and work data (power supply list data, power price list data, renewable source certificate holding list data, and power transaction history data) necessary for execution of the programs. The storage 1303 is a large-capacity storage device such as a solid state drive (SSD) and a hard disk drive (HDD).

Figure 14:
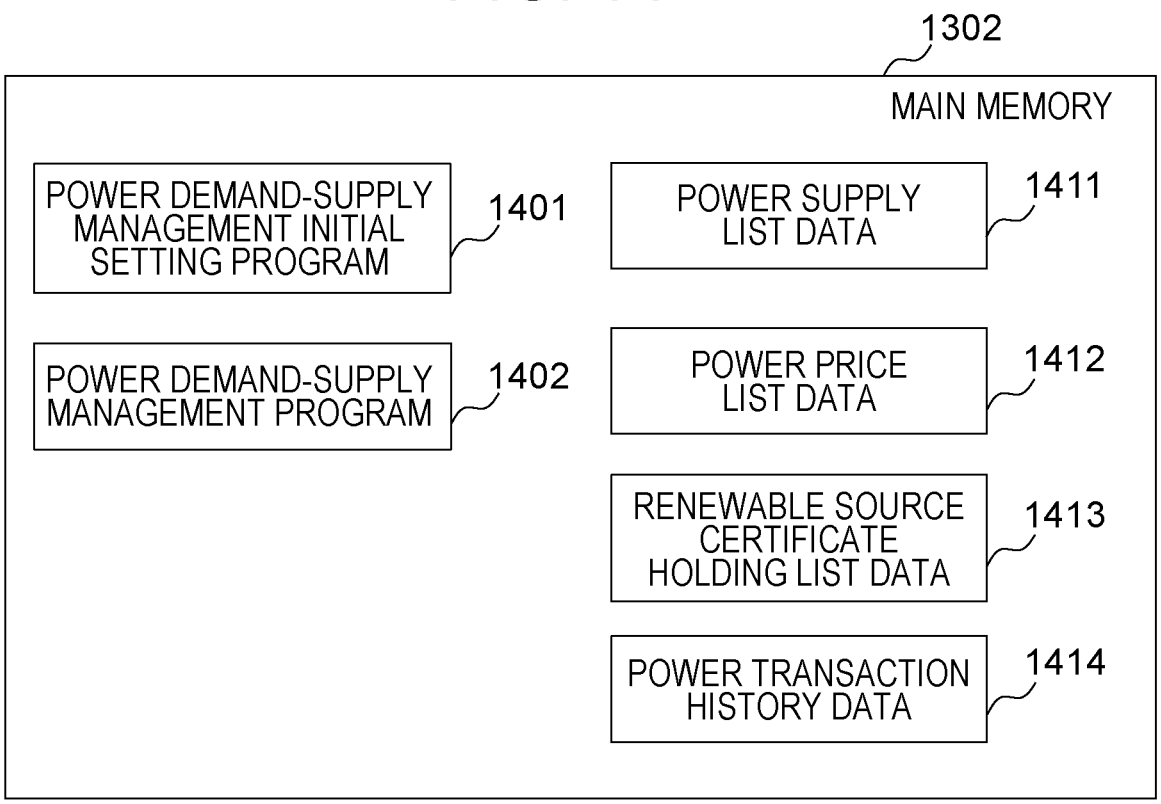
FIG. 14 is an explanatory diagram illustrating data stored in a memory in the power demand-supply management apparatus in the power management system of FIG. 1A.

FIG. 14 is an explanatory diagram illustrating data stored in the memory in the power demand-supply management apparatus 30 in the power management system of FIG. 1A. A power demand-supply initial setting program 1401 and a power demand-supply management program 1402 are loaded and executed in the main memory 1302. In addition, power supply list data 1411, power price list data 1412, renewable source certificate holding list data 1413, and power transaction history data 1414 necessary for execution of the programs are held. The power supply list data 1411 is data based on FIG. 2, and is data of a list of systems that can supply power.

The power price list data 1412 is data based on FIG. 3, and is list data indicating a price per providable power type. The renewable source certificate holding list data 1413 is data based on FIG. 6, and is data of a list of renewable source certificates in which system IDs consuming power are not determined. The power transaction history data 1414 is history data in power transactions described with reference to FIGS. 8 to 12.

Figure 15:
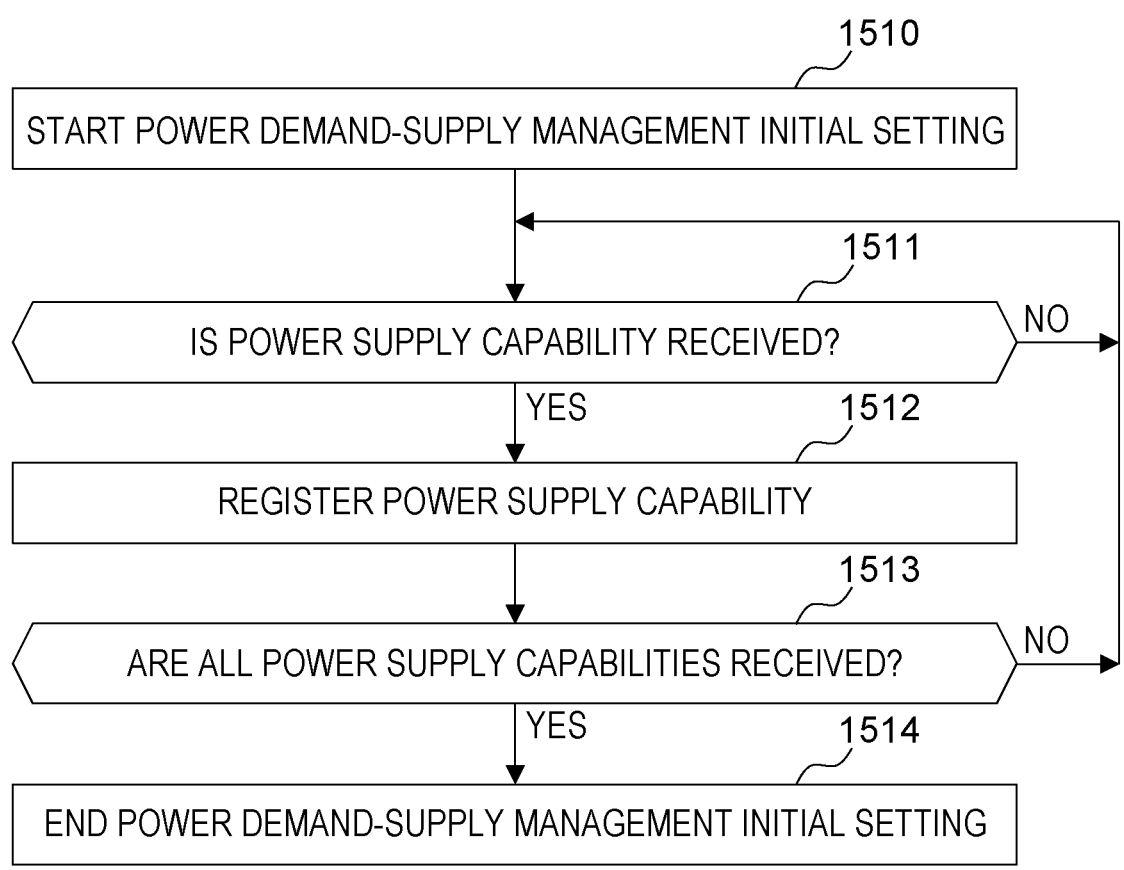
FIG. 15 is a flowchart illustrating a procedure of initial setting of the power demand-supply management apparatus in the power management system of FIG. 1A.

FIG. 15 is a flowchart illustrating a procedure of initial setting of the power demand-supply management apparatus 30 in the power management system of FIG. 1A. The CPU 1301 of the power demand-supply management apparatus 30 loads the power demand-supply initial setting program 1401 stored in the storage 1303 onto the main memory 1302 and starts initial setting (step S1510).

The power demand-supply management apparatus 30 determines whether a power supply capability application has been received (step S1511). When it is determined in the determination of step S1511 that the power supply capability application has not been received, the process of step S1511 is continued. When it is determined in the determination of step S1511 that the power supply capability application has been received, the received power supply capability application is registered (step S1512). Subsequently, the power demand-supply management apparatus 30 determines whether the power supply capability applications have been received from all the systems that supply power (step S1513).

When it is determined in the determination of step S1513 that the power supply capability applications have not been received from all the systems that supply power, the processing returns to step S1511 and is continued. When it is determined in the determination of step S1513 that the power supply capability applications have been received from all the systems that supply power, the power demand-supply initial setting is ended (step S1514).

FIG. 16 is a flowchart illustrating a procedure of demand-supply management of the power demand-supply management apparatus 30 in the power management system of FIG. 1A. The CPU 1301 of the power demand-supply management apparatus 30 loads the power demand-supply management program 1402 stored in the storage 1303 onto the main memory 1302 and starts power demand-supply management (step S1610).

The power demand-supply management apparatus 30 determines whether a power supply request has been received (step S1611). When it is determined in the determination of step S1611 that the power supply request has not been received, the process of step S1611 is continued. When it is determined in the determination of step S1611 that the power supply request has been received, whether time when the power is required is a renewable power generation time zone is subsequently determined (step S1612). When it is determined in the determination of step S1612 that it is the renewable power generation time zone, subsequently, whether renewable power is requested is determined (step S1613).

When it is determined in the determination of step S1613 that the renewable power is requested, control is executed to supply the renewable power from the renewable power supply system 50. In addition, a renewable source certificate is issued for the supplied renewable power and is supplied to the power demand system 10 that consumes the power via the power service system 20. Further, the distributed ledger system 60 is requested to record the content of the processed power transaction (step S1614).

When it is determined in the determination of step S1613 that the renewable power is not requested, whether same-time renewable power is requested is subsequently determined (step S1615). When it is determined in the determination of step S1615 that the same-time renewable power is requested, control is performed such that the same-time renewable power is supplied from the renewable power supply system 50. In addition, a same-time renewable source certificate is issued for the supplied same-time renewable power and is supplied to the power demand system 10 that consumes the power via the power service system 20. Further, the distributed ledger system 60 is requested to record the content of the processed power transaction (step S1616).

When it is determined in the determination of step S1615 that the same-time renewable power is not requested, it is determined that normal power is requested. In this case, power is supplied as normal power from the renewable power supply system 50 in order to increase consumption of renewable power. Meanwhile, a renewable source certificate that does not describe a system ID of a system that has consumed the power is issued and held for the amount of supplied power, and the distributed ledger system 60 is requested to record the content of the processed power transaction (step S1617).

When it is determined in the determination of step S1612 that it is not the renewable power generation time zone, subsequently, whether renewable power is requested is determined (step S1618). When it is determined in the determination of step S1618 that the renewable power is requested, control is executed to supply normal power from the normal power supply system 40. In addition, a renewable source certificate is issued by describing a system ID of a system that has consumed power in the held renewable source certificate in response to the amount of supplied normal power, and is supplied to the power demand system 10 that consumes the power via the power service system 20.

Further, the distributed ledger system 60 is requested to record the content of the processed power transaction (step S1619). When it is determined in the determination of step S1618 that the renewable power is not requested, whether same-time renewable power is requested is subsequently determined (step S1620). When it is determined in the determination of step S1620 that the same-time renewable power is requested, the power demand system 10 is notified that the supply of the same-time renewable power is not possible via the power service system 20 (step S1621). When it is determined in the determination of step S1620 that the same-time renewable power is not requested, it is determined that normal power is requested.

In response to the request, normal power is supplied from the normal power supply system 40, and the distributed ledger system 60 is requested to record the content of the processed power transaction (step S1622). After the processes of step S1614, step S1616, step S1617, step S1619, step S1621, and step S1622 are executed, power demand-supply management processing is ended (step S1623). Note that the case where each of the power demand system 10, the normal power supply system 40, and the renewable power supply system 50 is singular has been described in the first embodiment. However, a plurality of power demand systems, a plurality of normal power supply systems, and a plurality of renewable power supply systems may be provided, and control may be executed by selecting one of them.

In this manner, the power management system according to the first embodiment requests the same-time renewable power from the power demand-supply management apparatus 30 based on a demand request for the same-time renewable power from the power demand system 10. The power demand-supply management apparatus 30 requests the renewable power supply system 50 to supply the renewable power in the renewable power generation time zone, supplies the renewable power from the renewable power supply system 50, and issues the same-time renewable source certificate 700 corresponding to the amount of supplied renewable power and provides the same-time renewable source certificate 700 to the power demand system 10.

As described above, in the power management system according to the first embodiment, the case of consuming the power generated by RE in the same time zone (same-time renewable power consumption) and the case of consuming the power in different time zones (renewable power consumption) are distinguished and managed, and the renewable power can be supplied at different levels. In addition, it is possible to select and use power from among the normal power, the renewable power, and the same-time renewable power each time in the power management system according to the first embodiment.

Then, when the normal power is requested in the time zone in which power generation based on renewable energy is performed, the generated renewable power is preferentially used, the renewable power is managed in a divided manner with the normal power and the renewable source certificate, the renewable source certificate is held while supplying the normal power, so that the use of the renewable power can be promoted. In addition, when the renewable power is requested in the time zone in which the power generation based on renewable energy is not performed, the generated normal power is supplied and the held renewable source certificate is supplied together for the amount of supplied power, so that the renewable power can be selectively used. Further, it is possible to improve traceability of the power transaction by recording the executed power transaction in the distributed ledger.

Second Embodiment

In the second embodiment, a charge/discharge system is further provided to the first embodiment, and an operation of supplying same-time renewable power by charging and discharging of renewable power will be described. Hereinafter, a power demand-supply management operation in a power management system according to second embodiment will be described with reference to FIGS. 17A to 23B.

Figure 17A:
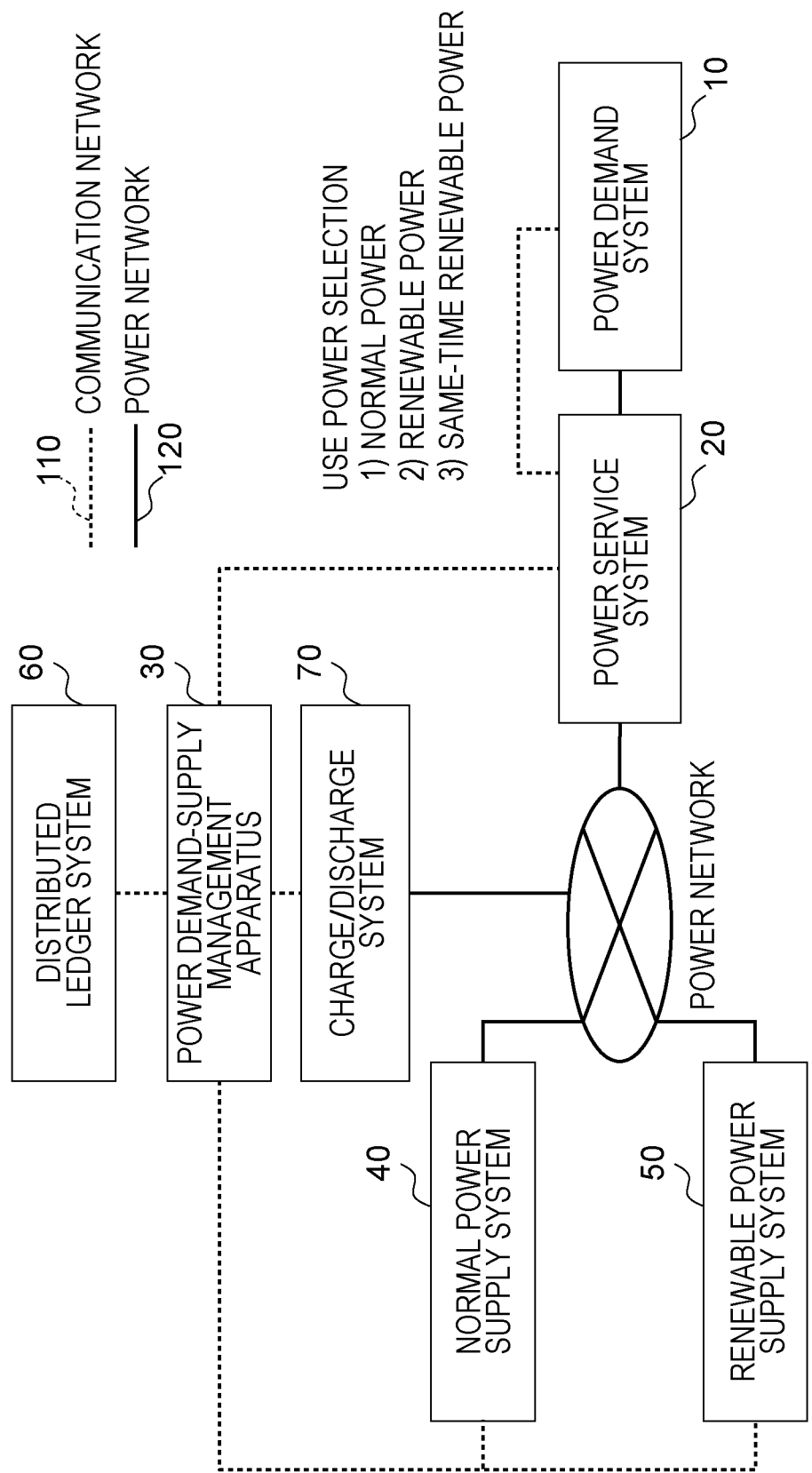
FIG. 17A is a functional block diagram illustrating a configuration of a power management system according to a second embodiment.

FIG. 17A is a functional block diagram illustrating a configuration of the power management system according to the second embodiment. The power management system illustrated in FIG. 17A is different from the power system illustrated in FIG. 1A in terms of further including a charge/discharge system 70 connected to the communication network 110 and the power network 120.

The charge/discharge system 70 is temporarily charged with generated renewable power, and supplies the renewable power by discharging the charged renewable power when same-time renewable power is requested in a case where power generation based on renewable energy is not performed.

In addition, at this time, the power demand-supply management apparatus 30 also issues a same-time renewable source certificate to supply the same-time renewable power to the power demand system 10 that has requested the same-time renewable power.

FIG. 17B is a table illustrating a power supply amount and a transaction unit price of each of normal power and renewable power as a power supply situation supplementing the power management system in FIG. 17A. FIG. 18 is a table illustrating charge/discharge capability application data in the power management system of FIG. 17A. The charge/discharge capability application data has the same configuration as the power supply capability application data described with reference to FIG. 2. However, it is configured such that an application is made for the ability related to charging and discharging in order for charging and discharging of generated power.

Specifically, an application is made regarding a management ID 201 for identifying each application, a system ID 202 of a system that executes charging and discharging, a power type 203 for charging, allowable power 206 for charging and discharging, and an allowable power amount 207. Note that the same numbers are assigned to similar contents as those in FIG. 2 in the numbers assigned in FIG. 18.

An application R3 illustrated in a row 213 indicates an application in which a charge/discharge system having a system ID of 70 can be charged and discharged in a range of 100 kW with respect to renewable power and in a capacity of up to 1000 kWh.

FIG. 19 is a table illustrating charge control and power purchase application data in the power management system of FIG. 17A. The charge control and power purchase application data in the second embodiment have the same configuration as the power purchase application data described in FIG. 5. The same numbers are assigned to similar contents as those in FIG. 5 in the numbers assigned in FIG. 19.

An application D4 illustrated in a row 521 is a content applied for by the power demand-supply management apparatus 30, and indicates an application in which the charge/discharge system having the system ID of 70 is charged with same-time renewable power for one hour at power of 100 kW from 13:00 on Apr. 1, 2020.

An application D5 illustrated in a row 522 is a content applied for by the power demand system 10, and indicates an application in which a power demand system having a system ID of 10 consumes same-time renewable power at power of 60 kW from 16:00 on Apr. 1, 2020.

Figure 20:
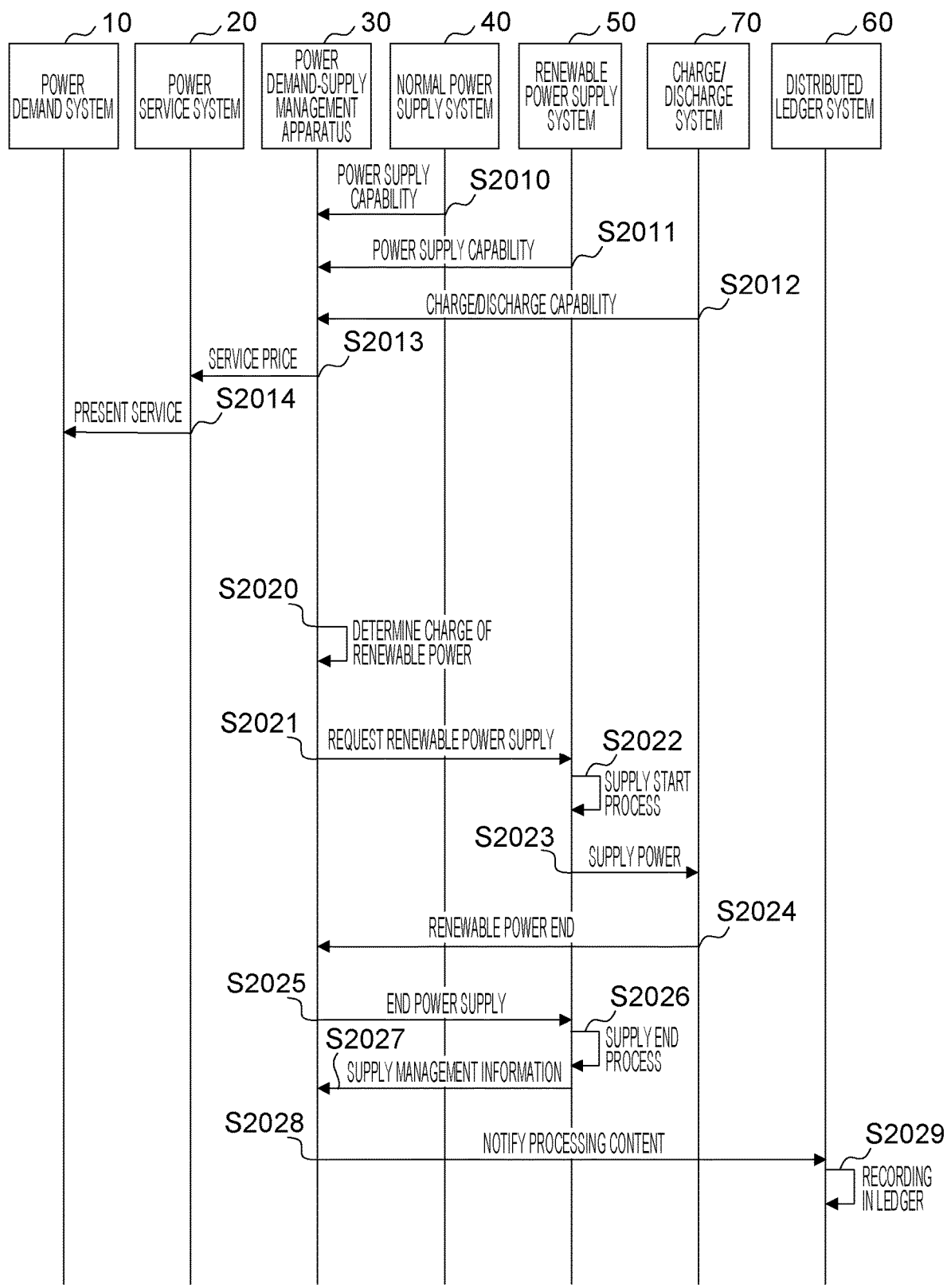
FIG. 20 is a sequence diagram illustrating renewable power charging during renewable power generation in the power management system of FIG. 17A.

FIG. 20 is a sequence diagram illustrating renewable power charging during renewable power generation in the power management system of FIG. 17A. First, the normal power supply system 40 notifies the power demand-supply management apparatus 30 of normal power that can be supplied (step S2010). For example, a system ID, a power type, a provision date, a provision time, power, and a power amount illustrated in the row 211 of FIG. 2 are notified.

The renewable power supply system 50 notifies the power demand-supply management apparatus 30 of renewable power that can be supplied (step S2011). For example, a system ID, a power type, a provision date, a provision time, power, and a power amount illustrated in the row 212 of FIG. 2 are notified.

The charge/discharge system 70 notifies the power demand-supply management apparatus 30 of chargeable and dischargeable renewable power (step S2012). For example, a system ID, a power type, power, and a power amount illustrated in the row 213 of FIG. 18 are notified.

The power demand-supply management apparatus 30 notifies the power service system 20 of a type of power that can be supplied, a price, and time when power can be supplied (step S2013). The power service system 20 presents a providable power service to the power demand system 10 (step S2014).

After the above initial setting is completed, the power demand-supply management apparatus 30 determines whether the charge/discharge system 70 needs to be charged with renewable power. For example, when a charge amount is less than 50% in the charge/discharge system 70, it is determined that the charging with renewable power needs to be performed (step S2020).

In addition, when it is determined that the charge/discharge system 70 needs to be charged with the renewable power, the power demand-supply management apparatus 30 controls the renewable power supply system 50 to supply the renewable power (step S2021).

The renewable power supply system 50 executes a renewable power supply start process in accordance with a renewable power request (step S2022). For example, control is performed to supply the renewable power to the power network, and the power supply start time is recorded. The renewable power supply system 50 supplies the renewable power to the charge/discharge system 70 (step S2023). When the necessary renewable power charging is completed, the charge/discharge system 70 notifies the power demand-supply management apparatus 30 of the charging end (step S2024).

When receiving the charging end notification from the charge/discharge system 70, the power demand-supply management apparatus 30 controls the renewable power supply system 50 to stop the renewable power supply (step S2025). The renewable power supply system 50 performs control to stop supplying the renewable power, and calculates the time when the supply is stopped and the amount of supplied renewable power (step S2026).

In addition, the renewable power supply system 50 notifies the power demand-supply management apparatus 30 of the supply start time and end time of the renewable power and the amount of supplied renewable power (step S2027). The power demand-supply management apparatus 30 notifies the distributed ledger system 60 of a charging content of the renewable power (step S2028).

The distributed ledger system 60 records the received charging content (step S2029). As the content to be recorded, for example, it is recorded that the charge/discharge system having the system ID of 70 is supplied and charged with renewable power of 100 kWh from 13:00 to 13:59 on Apr. 1, 2020 by the renewable power supply system having the system ID of 50.

Figure 21:
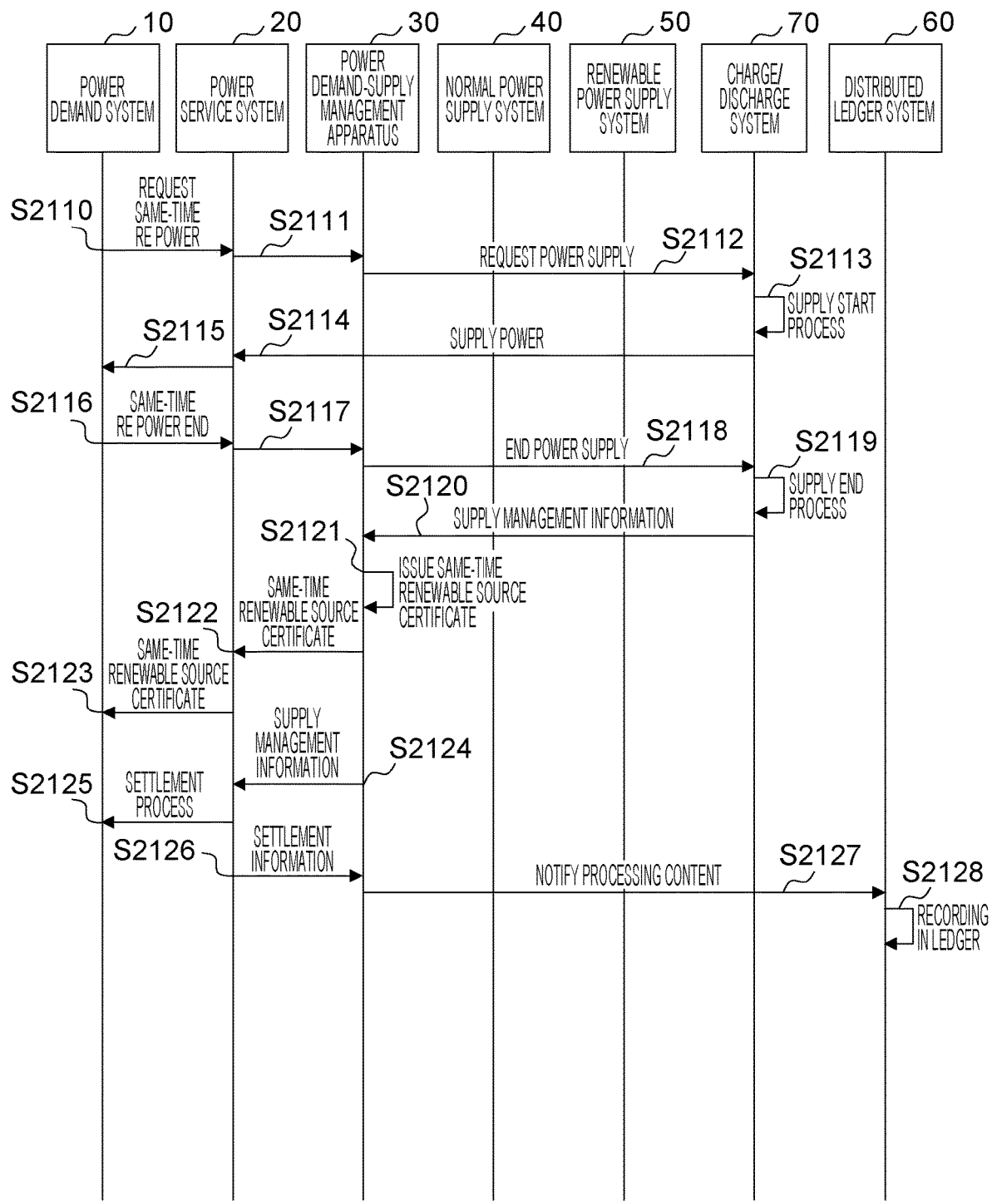
FIG. 21 is a sequence diagram illustrating same-time renewable power consumption during non-generation of renewable power in the power management system of FIG. 17A.

FIG. 21 is a sequence diagram illustrating same-time renewable power consumption during non-generation of renewable power in the power management system of FIG. 17A. The power demand system 10 requests required power (same-time renewable power) from the power service system 20 (step S2110). The power service system 20 notifies the power demand-supply management apparatus 30 of a received same-time renewable power purchase application (step S2111).

The power demand-supply management apparatus 30 confirms that the renewable power can be supplied from the charge/discharge system 70 in spite of a time zone in which the renewable power generation is not performed, and controls the charge/discharge system 70 to supply the renewable power (step S2112).

The charge/discharge system 70 performs a renewable power supply start process in accordance with a received renewable power supply request (step S2113). For example, control is performed to supply the renewable power to the power network, and the renewable power supply start time is recorded. In addition, the charge/discharge system 70 starts supplying the renewable power to the power service system 20 in accordance with the received renewable power supply request (step S2114). The power service system 20 supplies the power demand system 10 with the supplied renewable power as same-time renewable power (step S2115).

Subsequently, when the necessary same-time renewable power is purchased, the power demand system 10 notifies the power service system 20 of the purchase end (step S2116). The power service system 20 notifies the power demand-supply management apparatus 30 of received purchase end information (step S2117). The power demand-supply management apparatus 30 controls the charge/discharge system 70 to stop supplying the renewable power based on the received purchase end information (step S2118). The charge/discharge system 70 performs control to stop supplying the renewable power, and calculates the time when the supply is stopped and the amount of supplied renewable power (step S2119).

Subsequently, the charge/discharge system 70 notifies the power demand-supply management apparatus 30 of the supply start time and end time of the renewable power and the amount of supplied renewable power (step S2120). The power demand-supply management apparatus 30 issues a same-time renewable source certificate corresponding to the amount of supplied same-time renewable power (step S2121), and notifies the power service system 20 of such same-time renewable source certificate data (step S2122).

The power service system 20 notifies the power demand system 10 of the received same-time renewable source certificate data (step S2123). The power demand-supply management apparatus 30 notifies the power service system 20 of the amount of supplied same-time renewable power (step S2124). The power service system 20 executes a settlement process for the same-time renewable power supplied to the power demand system 10 (step S2125).

In addition, the power service system 20 notifies the power demand-supply management apparatus 30 that the settlement process for the same-time renewable power supplied to the power demand system 10 has been completed (step S2126). The power demand-supply management apparatus 30 notifies the distributed ledger system 60 of a supply transaction content of the same-time renewable power (step S2127).

The distributed ledger system 60 records the received transaction content (step S2128). As the content to be recorded, for example, it is recorded that provided power is same-time renewable power, a system ID of a system which has consumed the same-time renewable power is 10, a system ID of a system which has supplied the same-time renewable power is 70, date and time when the same-time renewable power has been supplied is from 16:00 to 16:39 on Apr. 1, 2020, the amount of supplied same-time renewable power is 40 kWh, a price is 800 yen, and a same-time renewable source certificate has been assigned.

Figure 22:
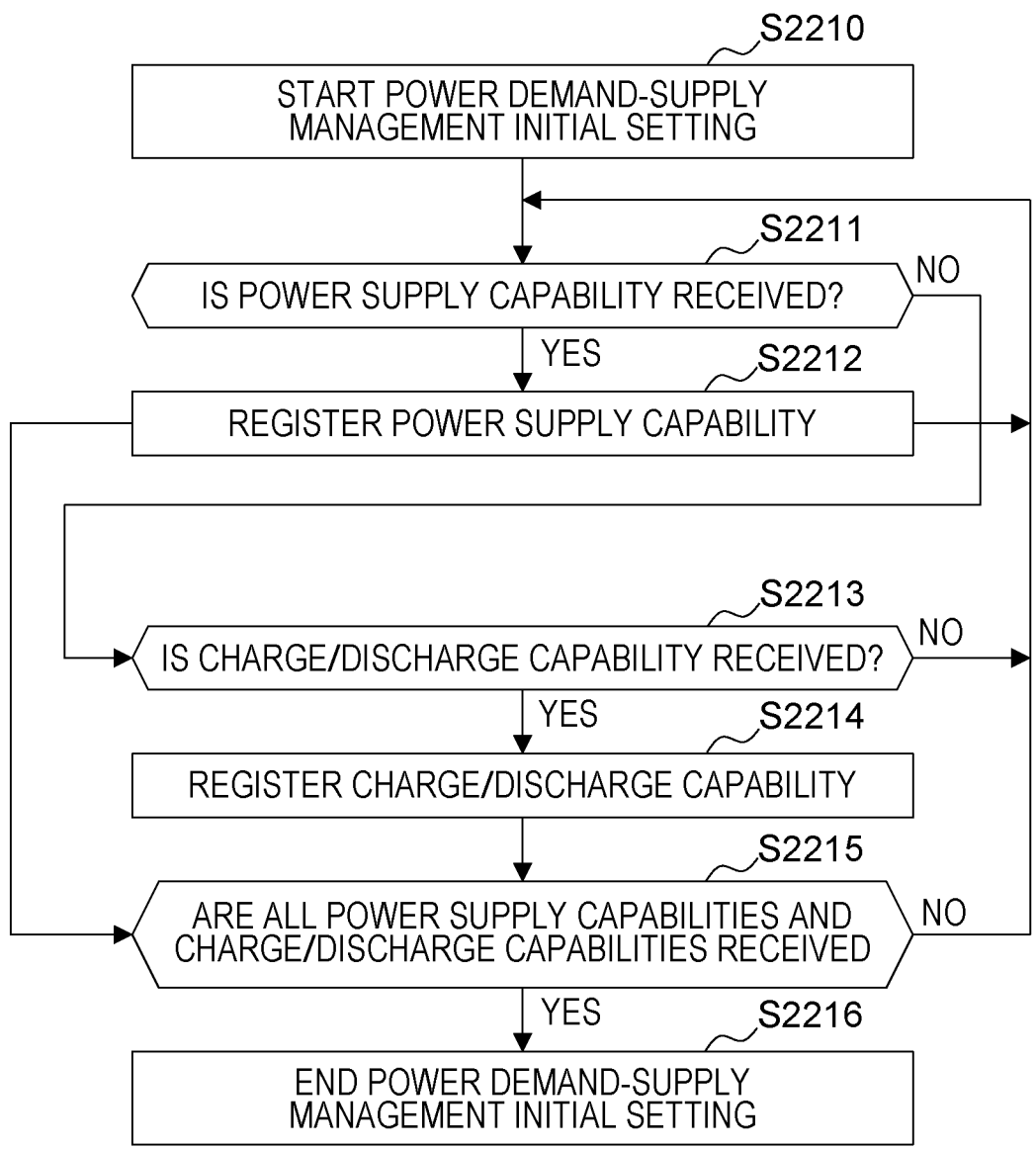
FIG. 22 is a flowchart illustrating a procedure of initial setting of a power demand-supply management apparatus in the power management system of FIG. 17A.

FIG. 22 is a flowchart illustrating a procedure of initial setting of a power demand-supply management apparatus 30 in the power management system of FIG. 17A. The CPU 1301 of the power demand-supply management apparatus 30 loads the power demand-supply initial setting program 1401 stored in the storage 1303 onto the main memory 1302 and starts initial setting (step S2210). The power demand-supply management apparatus 30 determines whether a power supply capability application has been received (step S2211). When it is determined in the determination of step S2211 that the power supply capability application has been received, the received power supply capability application is registered (step S2212).

Subsequently, the power demand-supply management apparatus 30 determines whether power supply capability applications have been received from all the systems that supply power and charge/discharge capability applications have been received from all the systems that perform charging and discharging of power (step S2215). When it is determined in the determination of step S2215 that the power supply capability applications have not been received from all the systems that supply power and the charge/discharge capability applications have not been received from all the systems that perform charging and discharging of power, the processing returns to the process of step S2211 and is executed.

On the other hand, when it is determined in the determination in step S2211 that the power supply capability application has not been received, whether a charge/discharge capability application has been received is subsequently determined (step S2213). When it is determined in the determination of step S2213 that the charge/discharge capability application has not been received, the processing returns to the process of step S2211 and is executed. When it is determined in the determination of step S2213 that the charge/discharge capability application has been received, the received charge/discharge capability is registered (step S2214), and step S2215 is subsequently executed.

When it is determined in the determination of step S2215 that the power supply capability applications have been received from all the systems that supply power and the charge/discharge capability applications have been received from all the systems that perform charging and discharging of power, the power demand-supply initial setting is ended (step S2216).

Figure 23A:
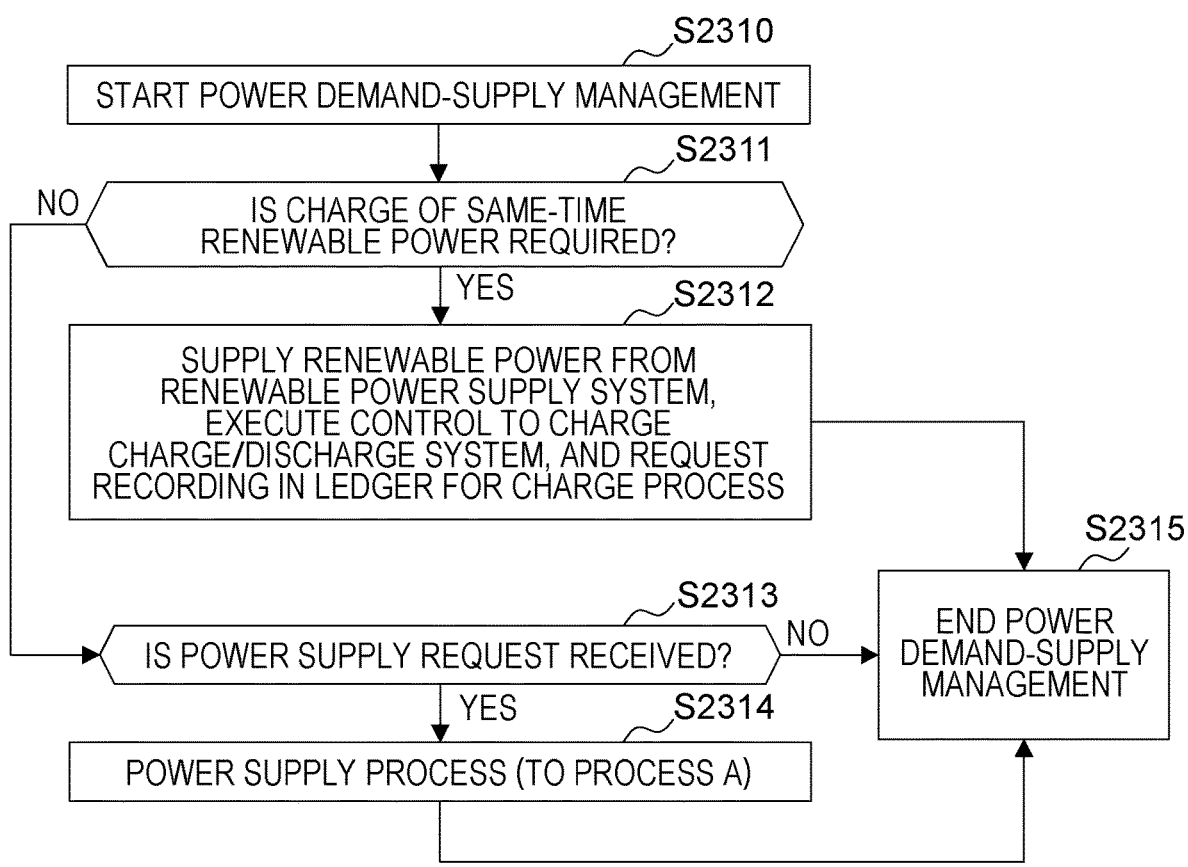
FIG. 23A is a flowchart illustrating a procedure of demand-supply management of the power demand-supply management apparatus in the power management system of FIG. 17A.
Figure 23B:
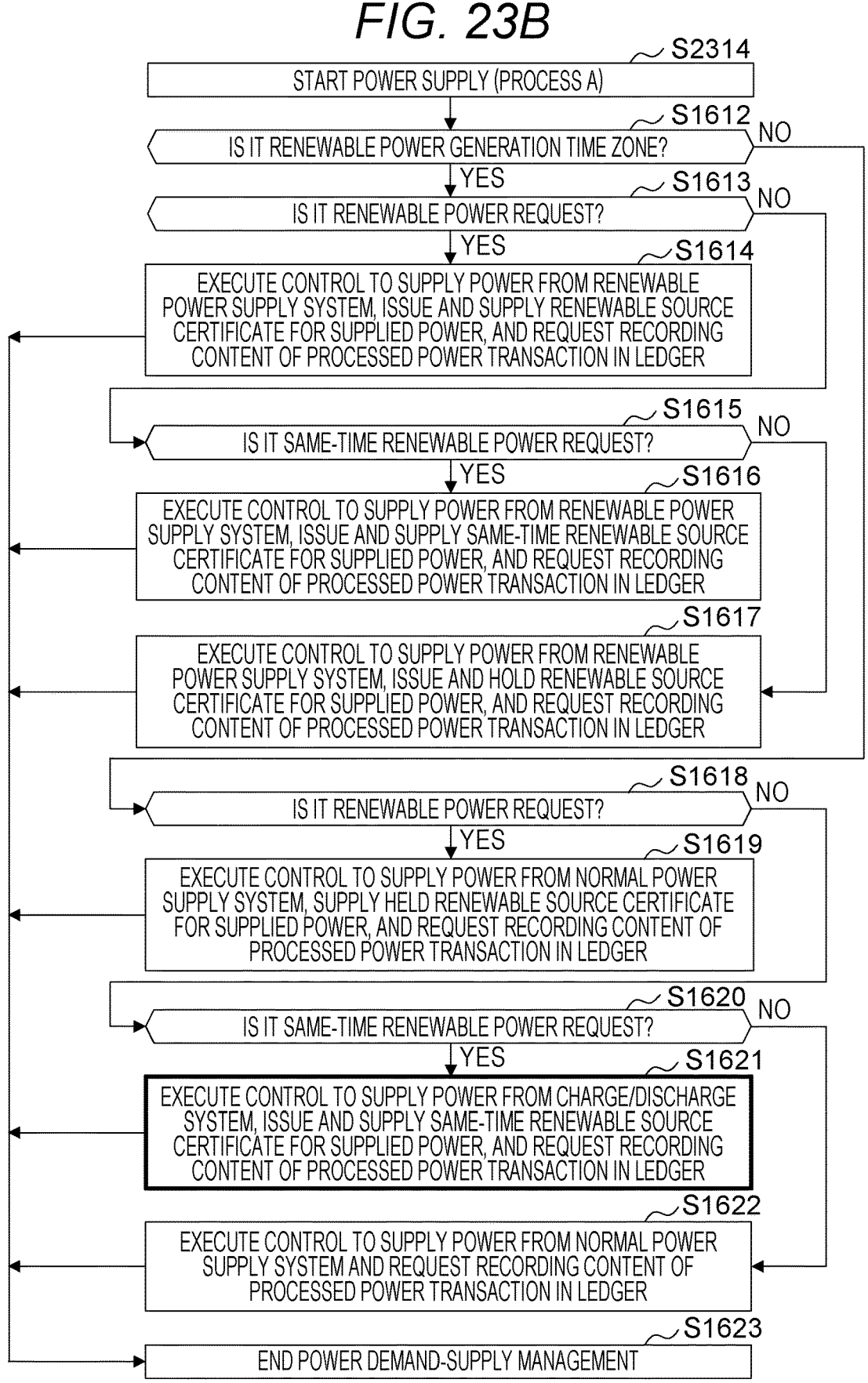
FIG. 23B is a flowchart illustrating a procedure of power supply control of the power demand-supply management apparatus in the power management system of FIG. 17A.

FIG. 23A is a flowchart illustrating a procedure of demand-supply management of the power demand-supply management apparatus 30 in the power management system of FIG. 17A. The CPU 1301 of the power demand-supply management apparatus 30 loads the power demand-supply management program 1402 stored in the storage 1303 onto the main memory 1302 and starts power demand-supply management (step S2310). The power demand-supply management apparatus 30 determines whether the charge/discharge system 70 needs to be charged with same-time renewable power (step S2311).

When it is determined in the determination of step S2311 that the charging of the same-time renewable power is necessary, control is performed to supply the renewable power from the renewable power supply system 50 and charge the charge/discharge system, a request is made to notify and record a content of the charge processing to the distributed ledger system (step S2312). As the content to be recorded, for example, it is recorded that the charge/discharge system having the system ID of 70 is supplied and charged with renewable power of 100 kWh from 13:00 to 13:59 on Apr. 1, 2020 by the renewable power supply system having the system ID of 50.

Note that, regarding the necessity of charging with the renewable power, it is determined that the charging with the renewable power is necessary, for example, when a charge amount is less than 50% in the charge/discharge system 70. If it is determined in the determination of step S2311 that the charging with the same-time renewable power is unnecessary, whether a power supply request has been received is subsequently determined (step S2313). When it is determined in the determination of step S2313 that the power supply request has been received, a power supply process (process A) is executed (step S2314).

The power demand-supply management apparatus 30 ends the power demand-supply management after executing steps S2312 and S2314 or when determining that the power supply request is not received in the determination of step S2313 (step S2315).

FIG. 23 is a flowchart illustrating a procedure of power supply control of the power demand-supply management apparatus 30 in the power management system of FIG. 17A. In this flowchart of the power supply control, the same processes as those in the demand-supply management flowchart of FIG. 16 are denoted by the same reference signs. That is, steps S1612 to S1620 and step S1622 are the same as the processes in the flowchart of the demand-supply management in FIG. 16. Therefore, processes different from the processes in the flowchart of the demand-supply management in FIG. 16 will be described.

Since it is not a renewable power generation time zone based on the determination in step S1612 when it is determined in the determination in step S1620 that the same-time renewable power request has been received, the power demand-supply management apparatus 30 causes the charge/discharge system 70 to discharge and supply renewable power, issues and supplies a same-time renewable source certificate in response to the amount of supplied renewable power, and further, notifies the distributed ledger system 60 of a content of a processed power transaction and requests recording (step S2320).

As the content to be recorded, for example, it is recorded that provided power is same-time renewable power, a system ID of a system which has consumed the same-time renewable power is 10, a system ID of a system which has supplied the same-time renewable power is 70, date and time of demand and supply related to the same-time renewable power is from 16:00 to 16:39 on Apr. 1, 2020, the amount of the same-time renewable power for the demand and supply is 40 kWh, a price is 800 yen, and a same-time renewable source certificate has been assigned. Subsequently, the power demand-supply management apparatus 30 ends a power demand-supply management process (step S2315).

As described above, the charge/discharge system is charged with the generated renewable power and is discharged when necessary in the second embodiment, so that the same-time renewable power can be supplied even in a time zone in which power generation based on renewable energy is not performed. If the charge/discharge system 70 capable of shifting supply and demand timings intervenes in this manner, 100% of the demand can be covered by the renewable power even in bad weather. Therefore, the same-time renewable power certificate is to be issued even in such a case. As a result, it is possible to realize a society in which consumption of fossil fuels is suppressed.

Third Embodiment

In the third embodiment, a description will be given regarding an operation of issuing a same-time renewable source certificate when a charge/discharge system is charged with generated renewable power, dividing the same-time renewable source certificate, and issuing and supplying a same-time renewable source certificate in response to the amount of supplied renewable power when the renewable power is supplied from the charge/discharge system, with respect to the second embodiment.

Hereinafter, a power demand-supply management operation in a power demand-supply management apparatus according to the third embodiment will be described with reference to FIGS. 24 to 27C.

Figure 24:
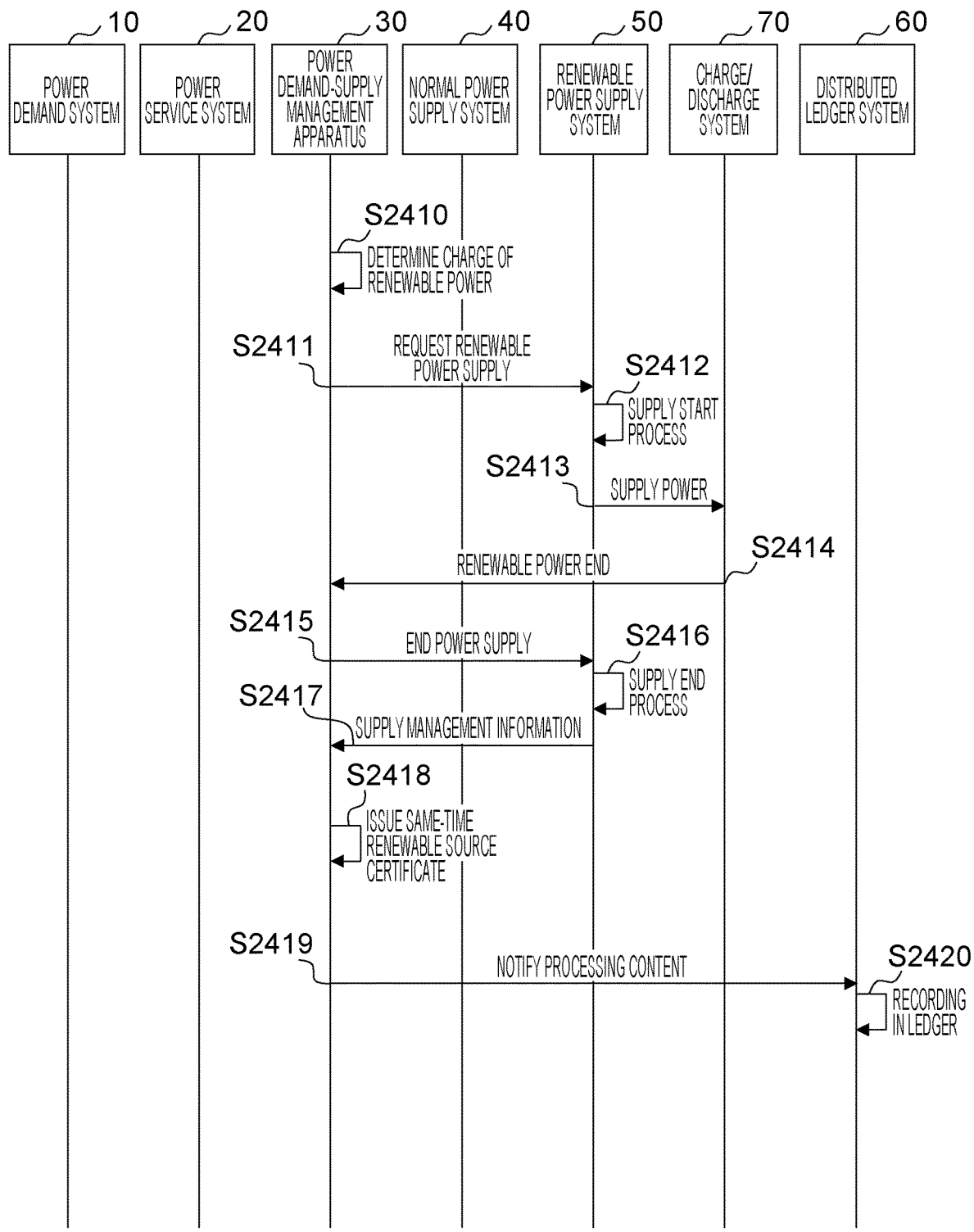
FIG. 24 is a sequence diagram illustrating renewable power charging during renewable power generation and issuance of a same-time renewable source certificate that can be issued in a divided manner in a power demand-supply management apparatus according to a third embodiment.

FIG. 24 is a sequence diagram illustrating renewable power charging during renewable power generation and issuance of a same-time renewable source certificate that can be issued in a divided manner in the power demand-supply management apparatus 30 according to the third embodiment. The power demand-supply management apparatus 30 determines whether the charge/discharge system 70 needs to be charged with renewable power. For example, when a charge amount is less than 50% in the charge/discharge system 70, it is determined that the charging with renewable power needs to be performed (step S2410).

In addition, when it is determined that the charge/discharge system 70 needs to be charged with the renewable power, the power demand-supply management apparatus 30 controls the renewable power supply system 50 to supply the renewable power (step S2411).

The renewable power supply system 50 executes a renewable power supply start process in accordance with a renewable power request (step S2412). For example, control is performed to supply the renewable power to the power network, and the power supply start time is recorded. The renewable power supply system 50 supplies the renewable power to the charge/discharge system 70 (step S2413). When the necessary renewable power charging is completed, the charge/discharge system 70 notifies the power demand-supply management apparatus 30 of the charging end (step S2414).

When receiving the charging end notification from the charge/discharge system 70, the power demand-supply management apparatus 30 controls the renewable power supply system 50 to stop the renewable power supply (step S2415). The renewable power supply system 50 performs control to stop supplying the renewable power, and calculates the time when the supply is stopped and the amount of supplied renewable power (step S2416).

In addition, the renewable power supply system 50 notifies the power demand-supply management apparatus 30 of the supply start time and end time of the renewable power and the amount of supplied renewable power (step S2417). The power demand-supply management apparatus 30 issues and holds a same-time renewable source certificate for the renewable power charged in the charge/discharge system 70 (step S2418). Note that the issued same-time renewable source certificate will be described later with reference to FIG. 27A.

In addition, the power demand-supply management apparatus 30 notifies a distributed ledger of the charging of the renewable power and the issuance of the same-time renewable source certificate (step S2419). The distributed ledger system 60 records the received charging content and the issued same-time renewable source certificate (step S2420). As the content to be recorded, for example, it is recorded that the charge/discharge system having the system ID of 70 is supplied with renewable power of 100 kWh from 13:00 to 13:59 on Apr. 1, 2020 by the renewable power supply system having the system ID of 50 and the same-time renewable source certificate has been assigned to the charge/discharge system 70.

Figure 25:
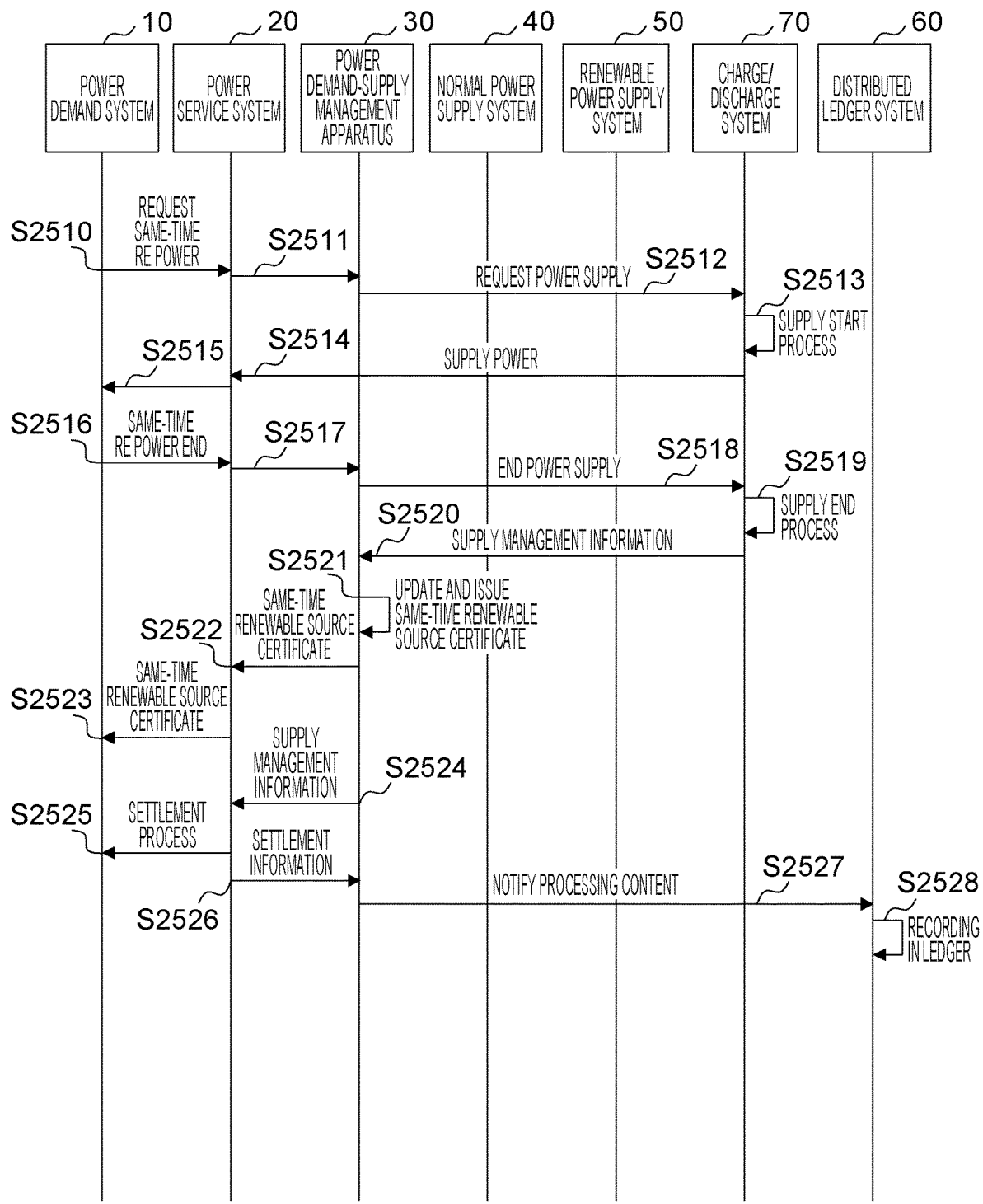
FIG. 25 is a sequence diagram illustrating same-time renewable power supply and update and issuance of the same-time renewable source certificate in the power demand-supply management apparatus according to the third embodiment.

FIG. 25 is a sequence diagram illustrating same-time renewable power supply and update and issuance of the same-time renewable source certificate in the power demand-supply management apparatus 30 according to the third embodiment. The power demand system 10 requests required power (same-time renewable power) from the power service system 20 (step S2510). The power service system 20 notifies the power demand-supply management apparatus 30 of a received same-time renewable power purchase application (step S2511).

The power demand-supply management apparatus 30 confirms whether it is the time when the renewable power can be supplied, and controls the charge/discharge system 70 to supply the renewable power if confirming that the renewable power supply from the charge/discharge system 70 is possible although it is a time zone in which the renewable power supply is not possible (step S2512).

The charge/discharge system 70 performs a renewable power supply start process in accordance with a received renewable power supply request (step S2513). For example, control is performed to supply the renewable power to the power network, and the renewable power supply start time is recorded. In addition, the charge/discharge system 70 starts supplying the renewable power to the power service system 20 in accordance with the received renewable power supply request (step S2514).

The power service system 20 supplies the power demand system 10 with the supplied renewable power as same-time renewable power (step S2515). Subsequently, when the necessary same-time renewable power is purchased, the power demand system 10 notifies the power service system 20 of the purchase end (step S2516). The power service system 20 notifies the power demand-supply management apparatus 30 of received purchase end information (step S2517).

The power demand-supply management apparatus 30 controls the charge/discharge system 70 to stop supplying the renewable power based on the received purchase end information (step S2518). The charge/discharge system 70 performs control to stop supplying the renewable power, and calculates the time when the supply is stopped and the amount of supplied power (step S2519).

Subsequently, the charge/discharge system 70 notifies the power demand-supply management apparatus 30 of the supply start time and end time of the renewable power and the amount of supplied power (step S2520). The power demand-supply management apparatus 30 divides an issued same-time renewable source certificate (which will be described later with reference to FIG. 27A) to issue a same-time renewable source certificate (which will be described later with reference to FIG. 27B) in response to the amount of supplied same-time renewable power and a same-time renewable source certificate (which will be described later with reference to FIG. 27C) in response to the amount of renewable power remaining in the charge/discharge system (step S2521), and notifies the power service system 20 of same-time renewable source certificate data for the amount of supplied renewable power (step S2522).

The power service system 20 notifies the power demand system 10 of the received same-time renewable source certificate data (step S2523). The power demand-supply management apparatus 30 notifies the power service system 20 of the amount of supplied same-time renewable power (step S2524). The power service system 20 executes a settlement process for the same-time renewable power supplied to the power demand system 10 (step S2525).

In addition, the power service system 20 notifies the power demand-supply management apparatus 30 that the settlement process for the same-time renewable power supplied to the power demand system 10 has been completed (step S2526). The power demand-supply management apparatus 30 notifies the distributed ledger system 60 of a supply transaction content of the same-time renewable power (step S2527).

The distributed ledger system 60 records the received transaction content (step S2528). As the content to be recorded, for example, it is recorded that provided power is same-time renewable power, a system ID of a system which has consumed the same-time renewable power is 10, a system ID of a system which has supplied the same-time renewable power is 70, date and time when the same-time renewable power has been supplied is from 16:00 to 16:39 on Apr. 1, 2020, the amount of supplied same-time renewable power is 40 kWh, a price is 800 yen, and a same-time renewable source certificate describing the amount of supplied renewable power per unit time has been assigned.

Figure 26A:
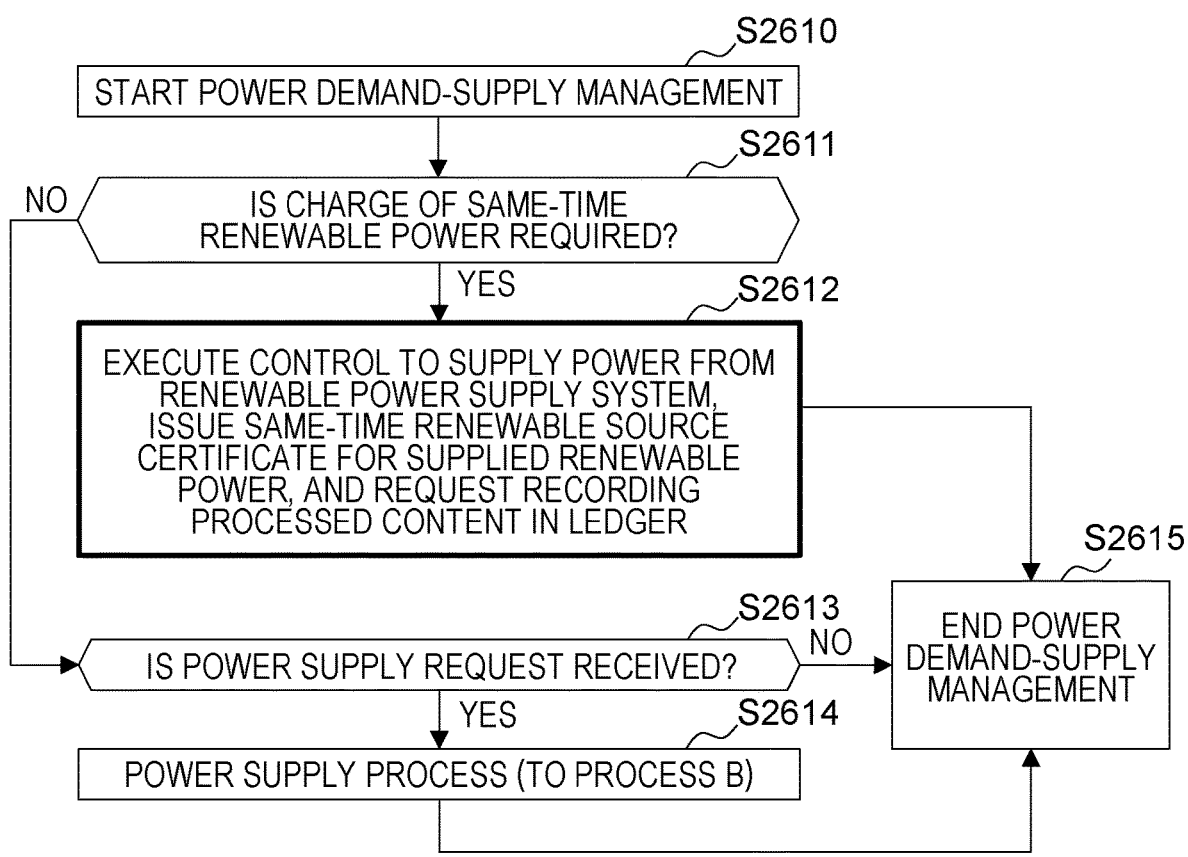
FIG. 26A is a flowchart illustrating a procedure of demand-supply management in a power demand-supply management apparatus according to the third embodiment.
Figure 26B:
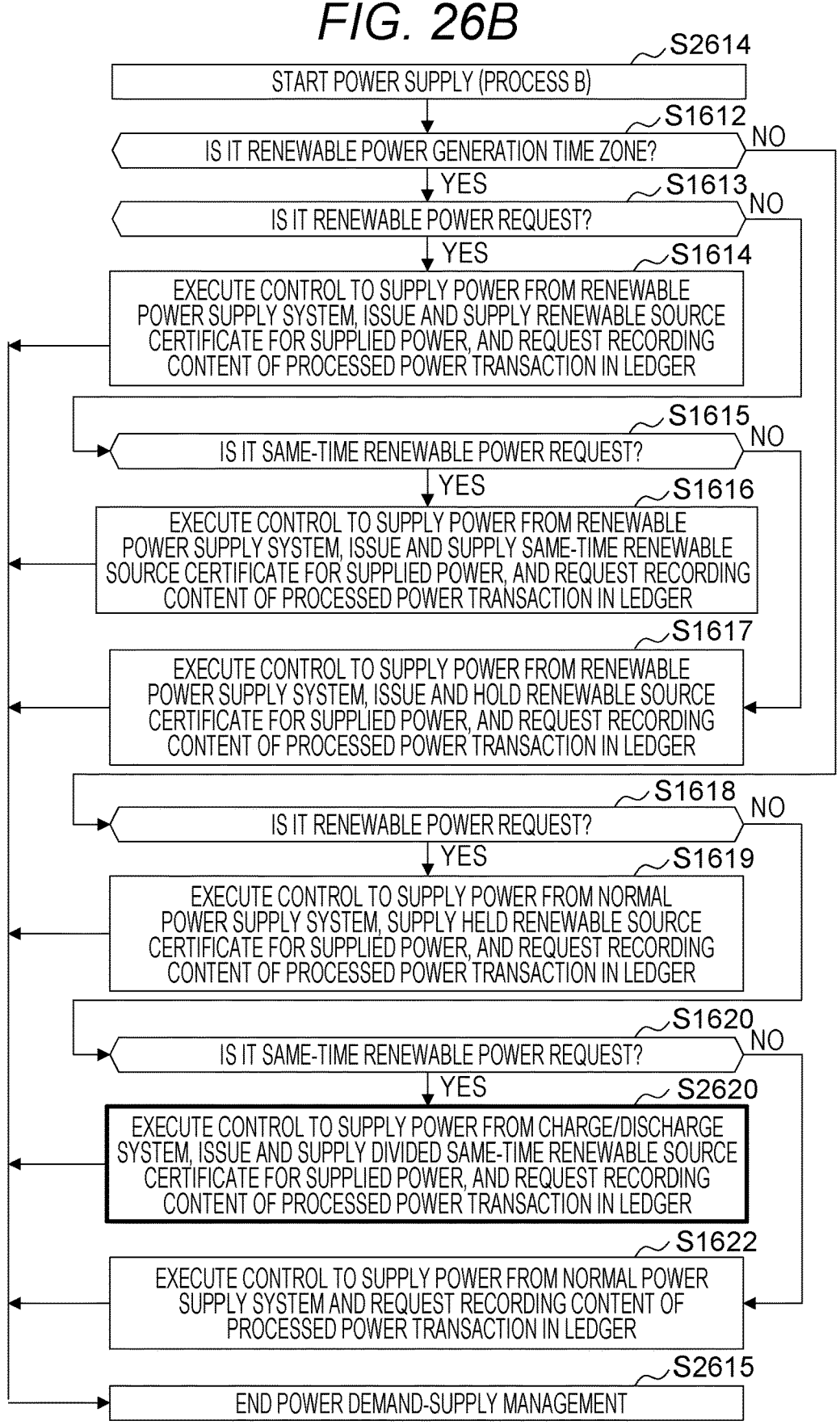
FIG. 26B is a flowchart illustrating a procedure of power supply control in the power demand-supply management apparatus according to the third embodiment.

FIG. 26 is a flowchart illustrating a procedure of demand-supply management in a power demand-supply management apparatus 30 according to the third embodiment. The CPU 1301 of the power demand-supply management apparatus 30 loads the power demand-supply management program 1402 stored in the storage 1303 onto the main memory 1302 and starts power demand-supply management (step S2610). The power demand-supply management apparatus 30 determines whether the charge/discharge system 70 needs to be charged with same-time renewable power (step S2611).

When it is determined in the determination of step S2611 that charging with the same-time renewable power is necessary, control is performed to supply the renewable power from the renewable power supply system 50 to charge the charge/discharge system. In addition, the charge/discharge system issues and holds a same-time renewable source certificate for the amount of renewable power charged in the charge/discharge system. Further, the distributed ledger system is notified of processing of the charging and issuance of the same-time renewable source certificate, and is requested to perform recording (step S2612).

As a content to be recorded, for example, it is recorded that the charge/discharge system having the system ID of 70 is supplied and charged with renewable power of 100 kWh from 13:00 to 13:59 on Apr. 1, 2020 by the renewable power supply system having the system ID of 50 and the same-time renewable source certificate for the charged 100 kWh has been issued. Note that, regarding the necessity of charging with the renewable power, it is determined that the charging with the renewable power is necessary, for example, when a charge amount is less than 50% in the charge/discharge system 70.

If it is determined in the determination of step S2611 that the charging with the same-time renewable power is unnecessary, whether a power supply request has been received is subsequently determined (step S2613). When it is determined in the determination of step S2613 that the power supply request has been received, a power supply process (process B) is executed (step S2614). The power demand-supply management apparatus 30 ends the power demand-supply management after executing steps S2612 and S2614 or when determining that the power supply request is not received in the determination of step S2613 (step S2615).

FIG. 26 is a flowchart illustrating a procedure of power supply control in the power demand-supply management apparatus 30 according to the third embodiment. In this flowchart of the power supply control, the same processes as those in the demand-supply management flowchart of FIG. 16 are denoted by the same reference signs. That is, steps S1612 to S1620 and step S1622 are the same as the processes in the flowchart of the demand-supply management in FIG. 16. Therefore, processes different from the processes in the flowchart of the demand-supply management in FIG. 16 will be described.

When it is determined in the determination of step S1620 that a same-time renewable power request has been received, the power demand-supply management apparatus 30 discharges and supplies the renewable power from the charge/discharge system 70 since it is not a renewable power generation time zone based on the determination in step S1612. In addition, the issued same-time renewable source certificate (which will be described later with reference to FIG. 27A) is divided to issue the same-time renewable source certificate (which will be described later with reference to FIG. 27B) in response to the amount of supplied same-time renewable power and the same-time renewable source certificate (which will be described later with reference to FIG. 27C) in response to the amount of renewable power remaining in the charge/discharge system 70.

Then, the power service system 20 is notified of the same-time renewable source certificate data for the amount of supplied renewable power. Further, the distributed ledger system 60 is notified of a content of a processed power transaction and the issued same-time renewable source certificate and is requested to perform recording (step S2620).

As the content to be recorded, for example, it is recorded that provided power is same-time renewable power, a system ID of a system which has consumed the same-time renewable power is 10, a system ID of a system which has supplied the same-time renewable power is 70, date and time when the same-time renewable power has been supplied in response to the demand is from 16:00 to 16:39 on Apr. 1, 2020, the amount of supplied same-time renewable power is 40 kWh, a price is 800 yen, and a same-time renewable source certificate describing the amount of supplied renewable power per unit time has been assigned. Subsequently, the power demand-supply management apparatus 30 ends a power demand-supply management process (step S2615).

Figure 27A:
FIG. 27A is a view illustrating a display screen of same-time renewable source certificate data before division in the power demand-supply management apparatus according to the third embodiment.

FIG. 27A is a view illustrating a display screen of same-time renewable source certificate data before division in the power demand-supply management apparatus 30 according to the third embodiment. A same-time renewable source certificate 2710 according to the third embodiment further includes an index 2750 indicating whether the same-time renewable source certificate can be divided, and a list 2711 describing the supplied time and the amount of supplied renewable power amount, with respect to the same-time renewable source certificate 700 illustrated in FIG. 7. The same reference signs are assigned to same contents (701 to 706) as those of the same-time renewable source certificate 700 in FIG. 7.

The third embodiment illustrates that the same-time renewable source certificate has been issued at 14:00 on Apr. 1, 2020. Illustrated is that the same-time renewable source certificate ID is Z02, the system ID of the system that has consumed the same-time renewable power is 70, the system ID of the system that has supplied the same-time renewable power is 50, the date and time when the same-time renewable power has been supplied and consumed is from 13:00 to 13:59 on Apr. 1, 2020, and the amount of same-time renewable power supplied in response to the demand is 100 kWh.

In addition, this same-time renewable source certificate is issued to the charge/discharge system 70, and thus, the index indicating the division possibility is "possible", which indicates that the same-time renewable source certificate can be divided. On the other hand, in a case where power is directly consumed, the same-time renewable source certificate is set to be indivisible. Further, as the list 2711 describing the supplied time and the amount of supplied renewable power, it is illustrated that charging with the same-time renewable power of 100 kWh has been performed from 13:00 to 13:59. Note that the amount of charged renewable power is described at an interval of one hour in this same-time renewable source certificate for charging the charge/discharge system 70 with the renewable power, instead of supplying the renewable power to the power demand system 10, but may be described at an interval of five minutes or the like.

FIG. 27B is a view illustrating a display screen of same-time renewable source certificate data after division in the power demand-supply management apparatus 30 according to the third embodiment. A same-time renewable source certificate 2720 in the third embodiment has the same configuration as that of the same-time renewable source certificate 2710 illustrated in FIG. 27A. The same reference signs are assigned to the same contents (701 to 706 and 2750) as those of the same-time renewable source certificate 2710 in FIG. 27.

The third embodiment illustrates that the same-time renewable source certificate has been issued at 16:40 on Apr. 1, 2020. Further, the same-time renewable source certificate ID is Z02-01, which indicates a division of the same-time renewable source certificate (ID is Z02) illustrated in FIG. 27. In addition, illustrated is that the system ID of the system that has consumed the same-time renewable power is 10, the system ID of the system that has supplied the same-time renewable power is 70, the date and time when the same-time renewable power has been supplied and consumed is from 16:00 to 16:39 on Apr. 1, 2020, and the amount of consumed same-time renewable power is 40 kWh.

Further, this same-time renewable source certificate has been issued to the power demand system 10 that directly consumes the renewable power, and thus, the index regarding the division possibility is set to "impossible", which indicates that the division of the same-time renewable source certificate is not possible. As a list 2721 describing the supplied time and the amount of supplied power, it is illustrated that the amount of same-time renewable power consumed at an interval of five minutes from 16:00 to 16:39 is 5 kWh. Note that the amount of consumed renewable power is described at the interval of five minutes in this same-time renewable source certificate since the system consuming the renewable power is the power demand system 10, but may be described at other intervals or the like.

FIG. 27C is a view illustrating a display screen of same-time renewable source certificate data after division in the power demand-supply management apparatus 30 according to the third embodiment. A same-time renewable source certificate (2730) in the third embodiment has the same configuration as that of the same-time renewable source certificate 2710 illustrated in FIG. 27A. The same reference signs are assigned to the same contents (701 to 706 and 2750) as those of the same-time renewable source certificate 2710 in FIG. 27.

The third embodiment illustrates that the same-time renewable source certificate has been issued at 16:40 on Apr. 1, 2020. The same-time renewable source certificate ID is Z02-02, which indicates a division of the same-time renewable source certificate (ID is Z02) illustrated in FIG. 27. In addition, illustrated is that the system ID of the system that has consumed the same-time renewable power is 70, the system ID of the system that has supplied the same-time renewable power is 50, the date and time when the same-time renewable power has been consumed is from 13:00 to 13:59 on Apr. 1, 2020, and the amount of same-time renewable power supplied in response to the demand is 60 kWh.

In addition, this same-time renewable source certificate is issued to the charge/discharge system 70, and thus, the index indicating the division possibility is set to "possible", which indicates that the same-time renewable source certificate can be divided. Further, as a list 2731 describing the supplied time and the amount of supplied same-time renewable power, it is illustrated that charging with the same-time renewable power of 60 kWh has been performed from 13:00 to 13:59. Note that the amount of charged renewable power is described at an interval of one hour in this same-time renewable source certificate for charging the charge/discharge system 70 with the renewable power, but may be described at other intervals or the like.

As described above, the same-time renewable source certificate is issued when the charge/discharge system 70 is charged with the generated renewable power, and the same-time renewable source certificate is divided to issue and supply the same-time renewable source certificate in response to the amount of supplied renewable power when the renewable power is supplied from the charge/discharge system 70, whereby the same-time renewable source certificate can be issued in a divided manner. In order to achieve this function, it is technically possible to divide and use the same-time renewable source certificate by distinguishing and managing information on whether to divide a certificate, which is not included in a conventional certificate, between a case of charging power is charged (divisible) and a case of consuming power (indivisible) and incorporating the information into the certificate, and recording such division processing in the distributed ledger.

Fourth Embodiment

In the fourth embodiment, a description will be given regarding an operation of connecting a charge/discharge system 71 to the power service system 20, purchasing same-time renewable power, and issuing a same-time renewable source certificate, with respect to first embodiment. In addition, an operation in which the charge/discharge system 71 supplies the same-time renewable power to a power demand system 11 and issues the same-time renewable source certificate in a divided manner will be described. Hereinafter, a power demand-supply management operation according to the fourth embodiment will be described with reference to FIGS. 28 to 30.

Figure 28:
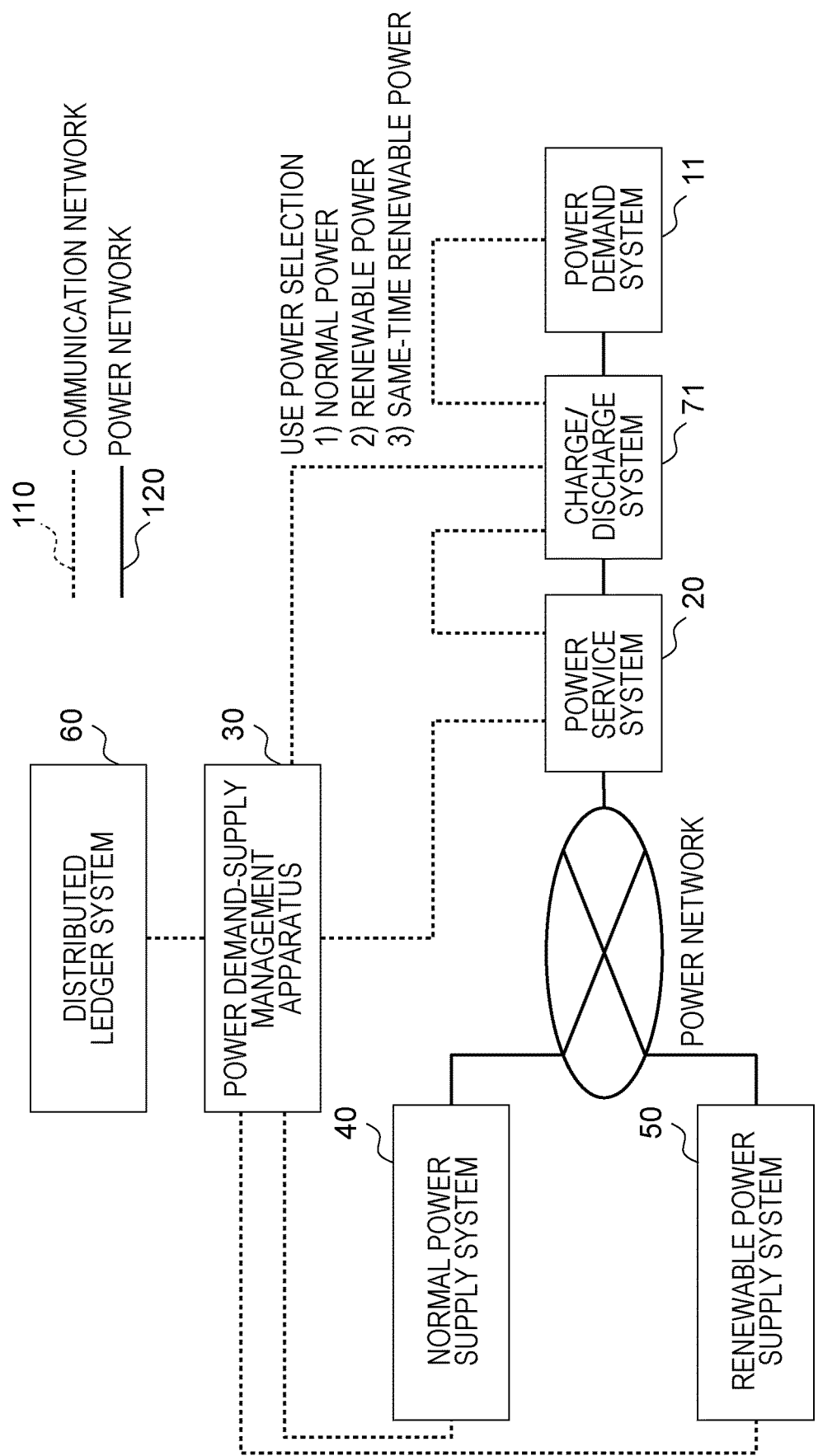
FIG. 28 is a functional block diagram illustrating a configuration of a power management system according to a fourth embodiment.

FIG. 28 is a functional block diagram illustrating a configuration of a power management system according to the fourth embodiment. The power management system illustrated in FIG. 28 is different from the power system illustrated in FIG. 1A in terms of further including the charge/discharge system 71 and the power demand system connected to the communication network 110 and the power network 120. The charge/discharge system 71 is temporarily charged with generated renewable power, and supplies same-time renewable power by discharging the charged same-time renewable power when the same-time renewable power is requested from the power demand system 11.

In addition, at this time, the power demand-supply management apparatus 30 also issues a same-time renewable source certificate to supply the same-time renewable power to the charge/discharge system 71 that has requested the same-time renewable power. Further, when the same-time renewable power is supplied to the power demand system 11, the charge/discharge system 71 requests the power demand-supply management apparatus 30 to issue a divided same-time renewable source certificate for the supplied same-time renewable power. The power demand-supply management apparatus 30 requests the distributed ledger system 60 to record the issued same-time renewable source certificate.

Figure 29:
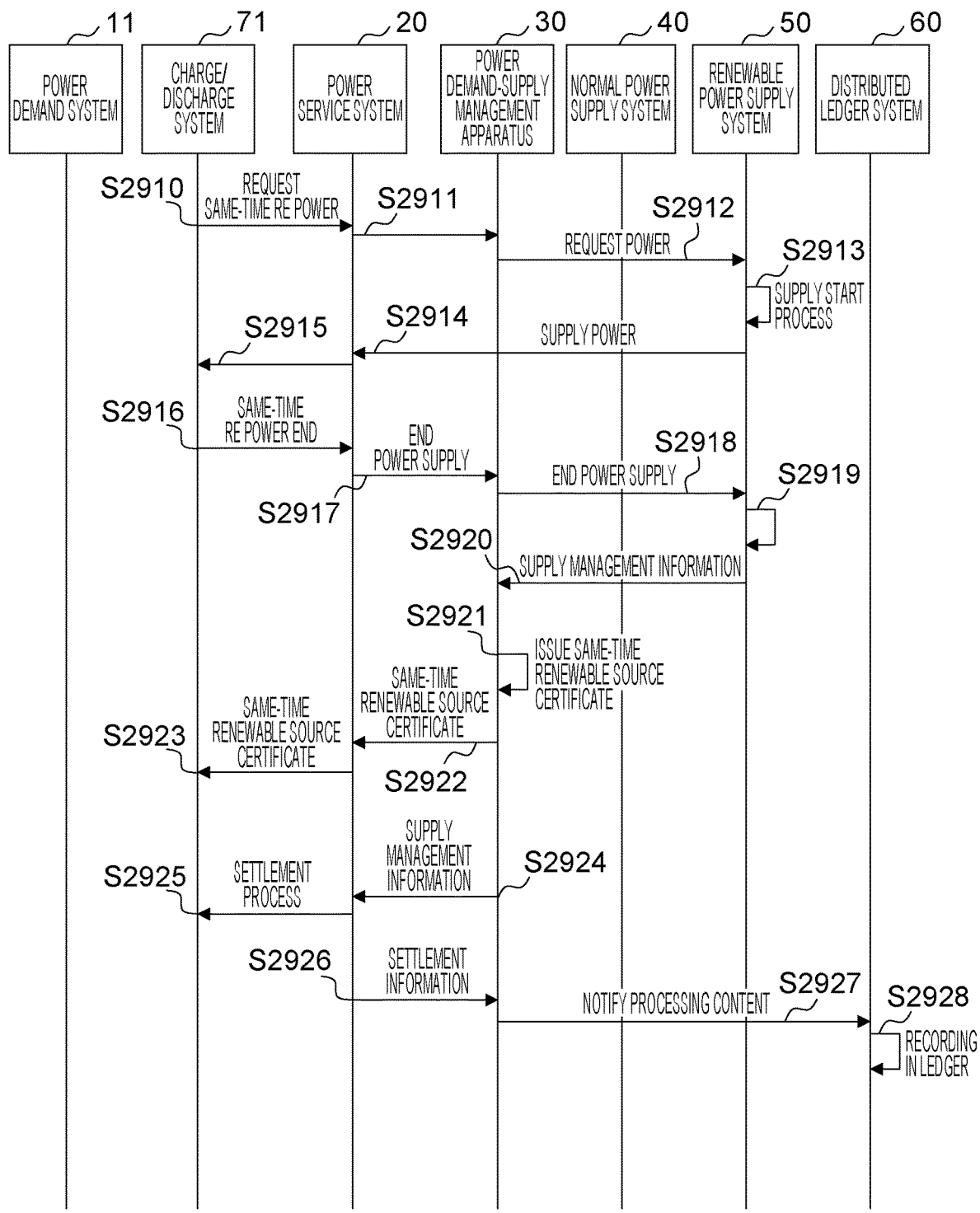
FIG. 29 is a sequence diagram illustrating renewable power charging and issuance of a same-time renewable source certificate based on a request from a charge/discharge system 71 in FIG. 28.

FIG. 29 is a sequence diagram illustrating renewable power charging and issuance of a same-time renewable source certificate based on a request from the charge/discharge system 71 in FIG. 28. The charge/discharge system 71 requests the same-time renewable power that is to be purchased from the power service system 20 (step S2910). The power service system 20 notifies the power demand-supply management apparatus 30 of a received same-time renewable power purchase application (step S2911).

The power demand-supply management apparatus 30 controls the renewable power supply system 50 to supply the renewable power in a time zone in which the renewable power can be supplied (step S2912). The renewable power supply system 50 executes a renewable power supply start process in accordance with a received renewable power supply request (step S2913). For example, control is performed to supply the renewable power to the power network 120, and the renewable power supply start time is recorded.

In addition, the renewable power supply system 50 starts supplying the renewable power to the power service system 20 in accordance with the received renewable power supply request (step S2914). The power service system 20 supplies the charge/discharge system 71 with the supplied renewable power as same-time renewable power (step S2915). Subsequently, when the necessary same-time renewable power is purchased, the charge/discharge system 71 notifies the power service system 20 of the purchase end (step S2916).

The power service system 20 notifies the power demand-supply management apparatus 30 of received purchase end information (step S2917). The power demand-supply management apparatus 30 controls the renewable power supply system 50 to stop the renewable power supply based on the received purchase end information (step S2918). The renewable power supply system 50 performs control to stop supplying the renewable power, and calculates the time when the supply is stopped and the amount of supplied power (step S2919).

Subsequently, the renewable power supply system 50 notifies the power demand-supply management apparatus 30 of the supply start time and end time of the renewable power and the amount of supplied renewable power (step S2920). The power demand-supply management apparatus 30 issues a same-time renewable source certificate corresponding to the amount of supplied same-time renewable power (step S2921), and notifies the power service system 20 of such same-time renewable source certificate data (step S2922).

The power service system 20 notifies the charge/discharge system 71 of the received same-time renewable source certificate data (step S2923). The power demand-supply management apparatus 30 notifies the power service system 20 of the amount of supplied same-time renewable power (step S2924). The power service system 20 executes a settlement process for the same-time renewable power supplied to the charge/discharge system 71 (step S2925).

In addition, the power service system 20 notifies the power demand-supply management apparatus 30 that the settlement process for the same-time renewable power supplied to the charge/discharge system 71 has been completed (step S2926). The power demand-supply management apparatus 30 notifies the distributed ledger system 60 of a supply transaction content of the same-time renewable power (step S2927).

The distributed ledger system 60 records the received transaction content (step S2928). As the content to be recorded, for example, it is recorded that a same-time renewable source certificate ID is Z03, a system ID of a system which has demanded the same-time renewable power is 71, a system ID of a system which has supplied the same-time renewable power is 50, date and time when the same-time renewable power has been supplied is from 14:00 to 14:39 on Apr. 1, 2020, the amount of supplied same-time renewable power is 40 kWh, an index indicating the division possibility is "possible", a price is 800 yen, and a same-time renewable source certificate has been assigned.

Figure 30:
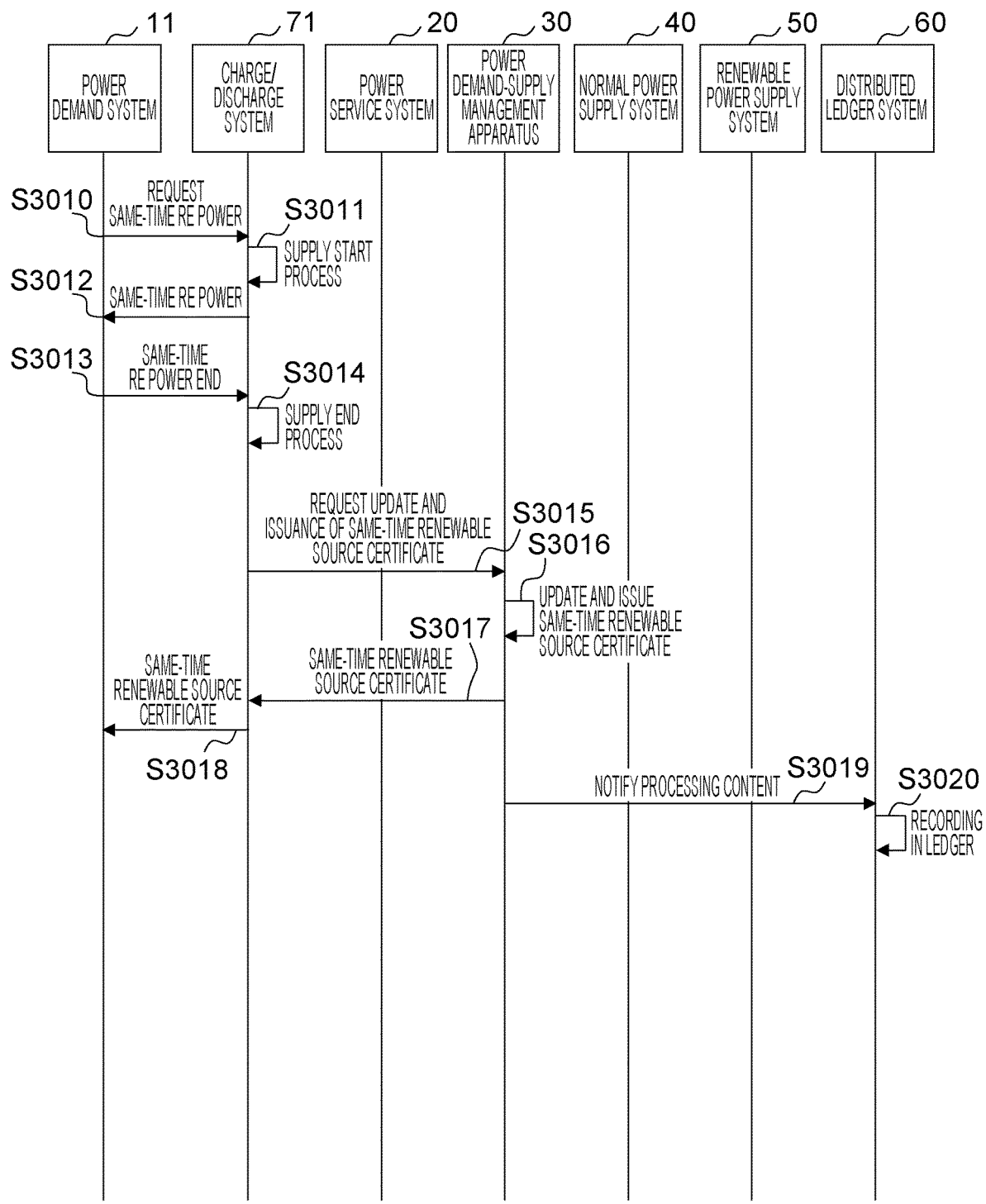
FIG. 30 is a sequence diagram illustrating division and issuance of a same-time renewable source certificate in the power management system in FIG. 28.

FIG. 30 is a sequence diagram illustrating division and issuance of a same-time renewable source certificate in the power management system in FIG. 28. The power demand system 11 requests the charge/discharge system 71 to supply same-time renewable power (step S3010). The charge/discharge system 71 executes a same-time renewable power supply start process when the same-time renewable power is charged and held (step S3011). For example, control is performed to supply the same-time renewable power to the power demand system 11, and the supply start time of the same-time renewable power is recorded.

In addition, the charge/discharge system 71 starts supplying the same-time renewable power to the power demand system 11 in accordance with the received same-time renewable power supply request (step S3012). Subsequently, when the necessary same-time renewable power is consumed, the power demand system 11 notifies the charge/discharge system 71 of the demand end (step S3013). The charge/discharge system 71 performs control to stop supplying the same-time renewable power to the power demand system 11 based on the received demand end information, and calculates the time when the supply is stopped and the amount of supplied power (step S3014).

The charge/discharge system 71 notifies the power demand-supply management apparatus 30 of information (ID: Z03) on a held same-time renewable source certificate and that the charge/discharge system 71 has supplied the power demand system 11 with the same-time renewable power of 20 kWh from 15:40 to 15:59 on Apr. 1, 2020, and makes an application for division of the same-time renewable source certificate (step S3015).

The power demand-supply management apparatus 30 divides the same-time renewable source certificate (ID: Z03) based on the received application for division of the same-time renewable source certificate to issue a same-time renewable source certificate (ID: Z03-01, division possibility: impossible) for the power demand system 11 and a same-time renewable source certificate (ID: Z03-02, division possibility: possible) for the same-time renewable power remaining in the charge/discharge system 71 (step S3016), and notifies the charge/discharge system 71 (step S3017).

The charge/discharge system 71 holds the same-time renewable source certificate (ID: Z03-02, division possibility: possible) and supplies the same-time renewable source certificate (ID: Z03-01, division possibility: impossible) to the power demand system 11 (step S3018).

The power demand-supply management apparatus 30 notifies the distributed ledger system 60 that the same-time renewable source certificate (ID: Z03) becomes invalid and the new same-time renewable source certificate (ID: Z03-01, division possibility: impossible) and the new same-time renewable source certificate (ID: Z03-02, division possibility: possible) have been issued, and requests recording (step S3019).

The distributed ledger system 60 records that the same-time renewable source certificate (ID: Z03) becomes invalid and the same-time renewable source certificate (ID: Z03-01, division possibility: impossible) and the same-time renewable source certificate (ID: Z03-02, division possibility: possible) have been newly issued (step S3020).

Note that a case where the charge/discharge system 71 and the power demand system 11 are possessed by the same owner is assumed in the above description, and a divided same-time renewable source certificate is not traded. On the other hand, in a case where the charge/discharge system 71 and the power demand system 11 are possessed by different owners, the same-time renewable source certificate may be traded in accordance with the same-time renewable power.

As described above, the same-time renewable power can be supplied to the power demand system 11 by connecting the charge/discharge system 71 to the power service system 20, temporarily charging and holding the same-time renewable power in the charge/discharge system 71, and discharging the same-time renewable power from the charge/discharge system 71. In addition, the same-time renewable source certificate is issued when the charge/discharge system 71 is charged with the same-time renewable power, and the initial same-time renewable source certificate can be divided to issue a new same-time renewable source certificate for the same-time renewable power consumed by the power demand system 11 when the power demand system 11 consumes the same-time renewable power discharged from the charge/discharge system 71.

In order to enable the same time certificate to be issued in a divided manner, the charge/discharge system 71 requests the power demand-supply management apparatus 30 to issue the same-time renewable source certificate in a divided manner when the same-time renewable power is supplied to the power demand system 11. The power demand-supply management apparatus 30 confirms a record of the same-time renewable source certificate requested to be issued in a divided manner in the distributed ledger system 60, and executes the issuance in a divided manner when it is verified that the issuance in a divided manner is possible, thereby technically enabling the issuance of the same-time renewable source certificate in a divided manner. Note that a renewable source certificate can also be divided and used by processing the renewable source certificate based on the scheme that enables the division of the same-time renewable source certificate.

Fifth Embodiment

Figure 31:
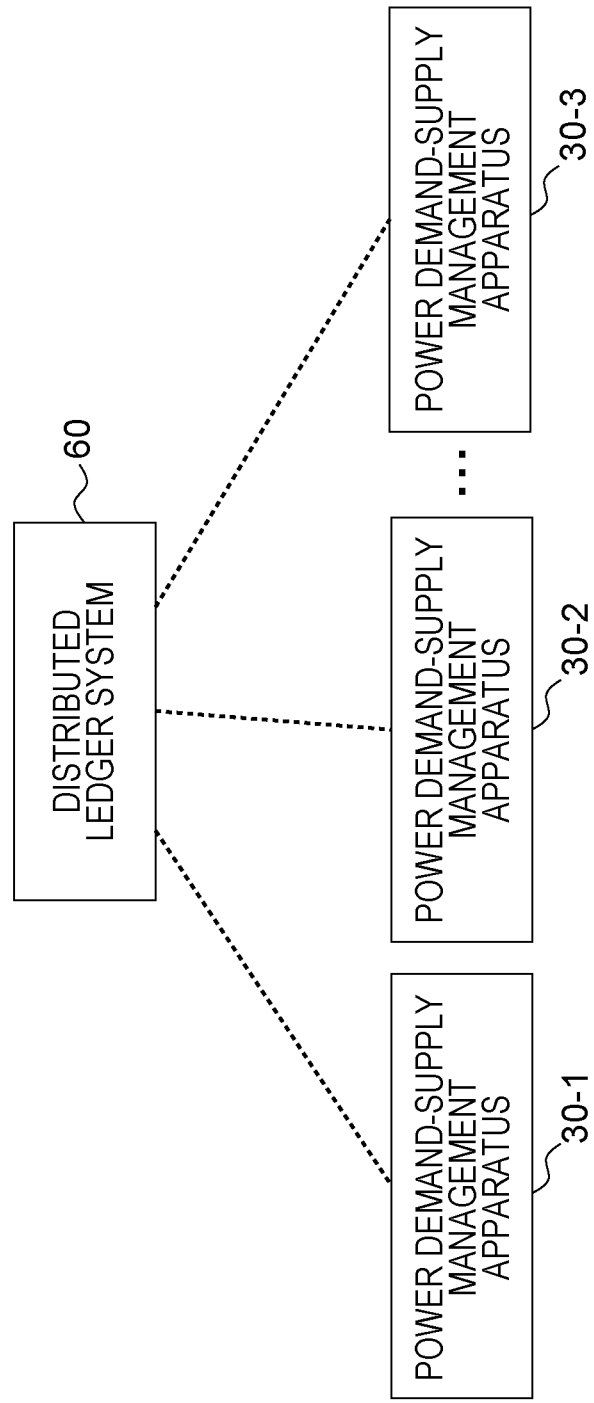
FIG. 31 is a functional block diagram illustrating a distributed ledger system 60 that records transactions for a plurality of power demand-supply management apparatuses according to a fifth embodiment.

In the fifth embodiment, an operation in which a distributed ledger system records power transactions managed by a plurality of power demand-supply management apparatuses will be described with reference to FIG. 31. FIG. 31 is a functional block diagram illustrating the distributed ledger system 60 that records transactions for a plurality of power demand-supply management apparatuses (30-1 to 30-3) according to the fifth embodiment. The distributed ledger system 60 is connected to the plurality of power demand-supply management apparatuses (30-1 to 30-3) via a communication network.

As described in the first embodiment, each of the power demand-supply management apparatuses (30-1 to 30-3) manages a transaction for the demand and supply of power, and records the transaction in the distributed ledger system 60. In the fifth embodiment, each of the plurality of power demand-supply management apparatuses (30-1 to 30-3) is connected to the distributed ledger system 60 to request recording of the managed power transaction.

The distributed ledger system 60 records the entire content of the power transactions requested from the plurality of power demand-supply management apparatuses (30-1 to 30-3). Note that three power demand-supply management apparatuses are illustrated in FIG. 31, but the number of power demand-supply management apparatuses may be different (N). As described above, the distributed ledger system 60 can record and hold the content related to the power transactions managed by the plurality of power demand-supply management apparatuses (30-1 to 30-3).

Sixth Embodiment

Figure 32:
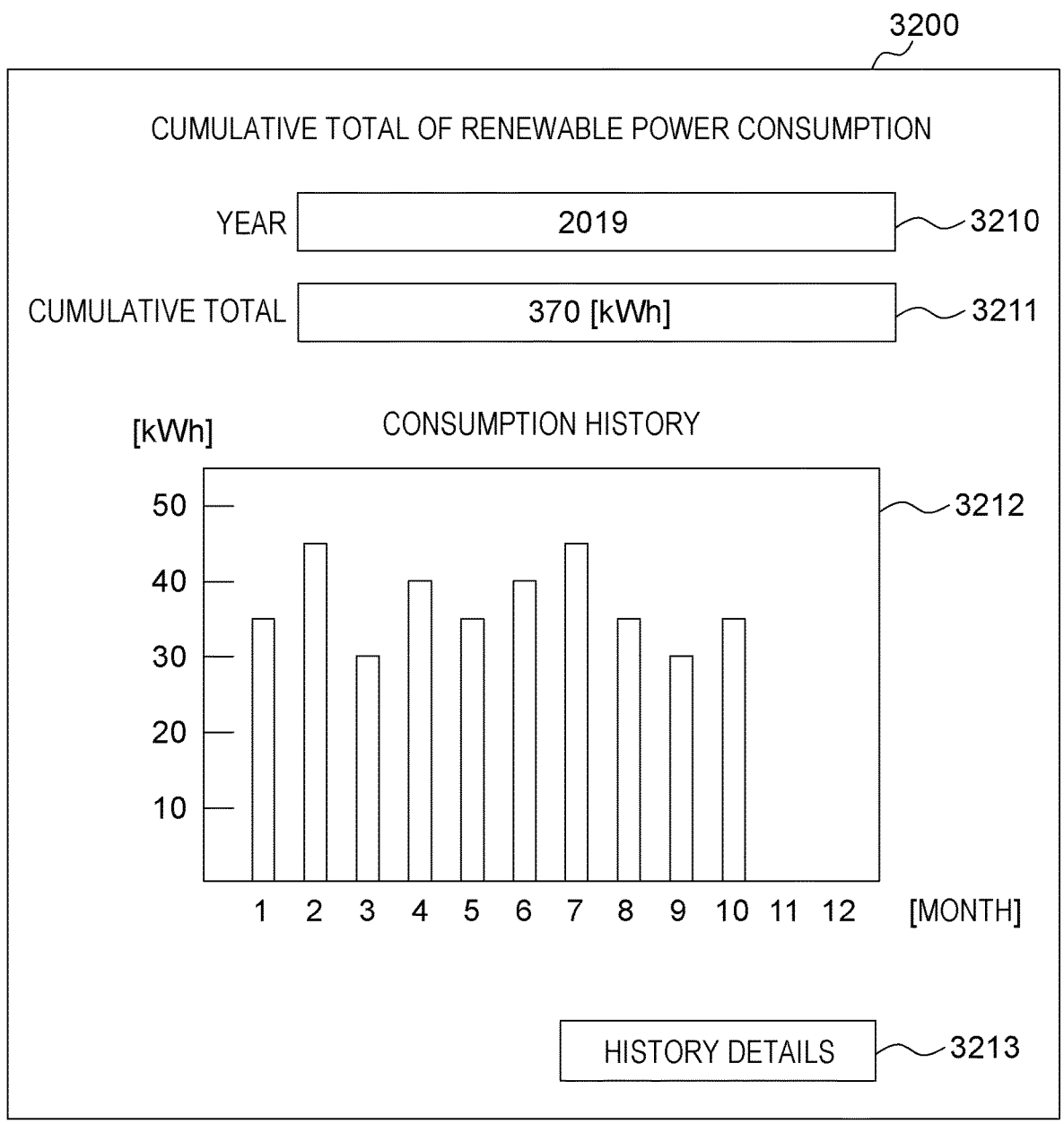
FIG. 32 is a view illustrating a display screen of renewable power consumption history data issued to a power demand system 10 by a power demand-supply management apparatus according to a sixth embodiment.

In the sixth embodiment, a description will be given regarding an operation in which the power demand-supply management apparatus 30 issues consumption history of renewable power and consumption history of same-time renewable power to the power demand system 10. FIG. 32 is a view illustrating a display screen of renewable power consumption history data issued to the power demand system 10 by the power demand-supply management apparatus 30 according to the sixth embodiment. In the first embodiment, the power demand system 10 consumes, for example, renewable power, and a content of a power transaction is managed by the power demand-supply management apparatus 30 and the distributed ledger system 60 each time.

In the sixth embodiment, data indicating monthly history and cumulative total of renewable power consumption is issued from the power demand-supply management apparatus 30 to the power demand system 10 every month. Renewable power consumption history data 3200 illustrated in FIG. 32 includes a year 3210 in which renewable power is consumed, a cumulative total 3211 of consumed renewable power, consumption history (3212) of renewable power in each month, and history details 3213 of renewable power consumption.

The sixth embodiment illustrates that the amount of consumed renewable power until October 2019 is 370 kWh. When a content of the history details 3213 is confirmed, the detailed history for each renewable power transaction can be confirmed. The confirmation of the consumption history of the renewable power has been described above. However, in a case where the power demand system 10 selects renewable power and normal power each time and consumes both the power, display is performed with different colors such that the respective power consumption amounts can be seen. In addition, information on each consumption ratio with respect to the total power consumption is also provided.

Figure 33:
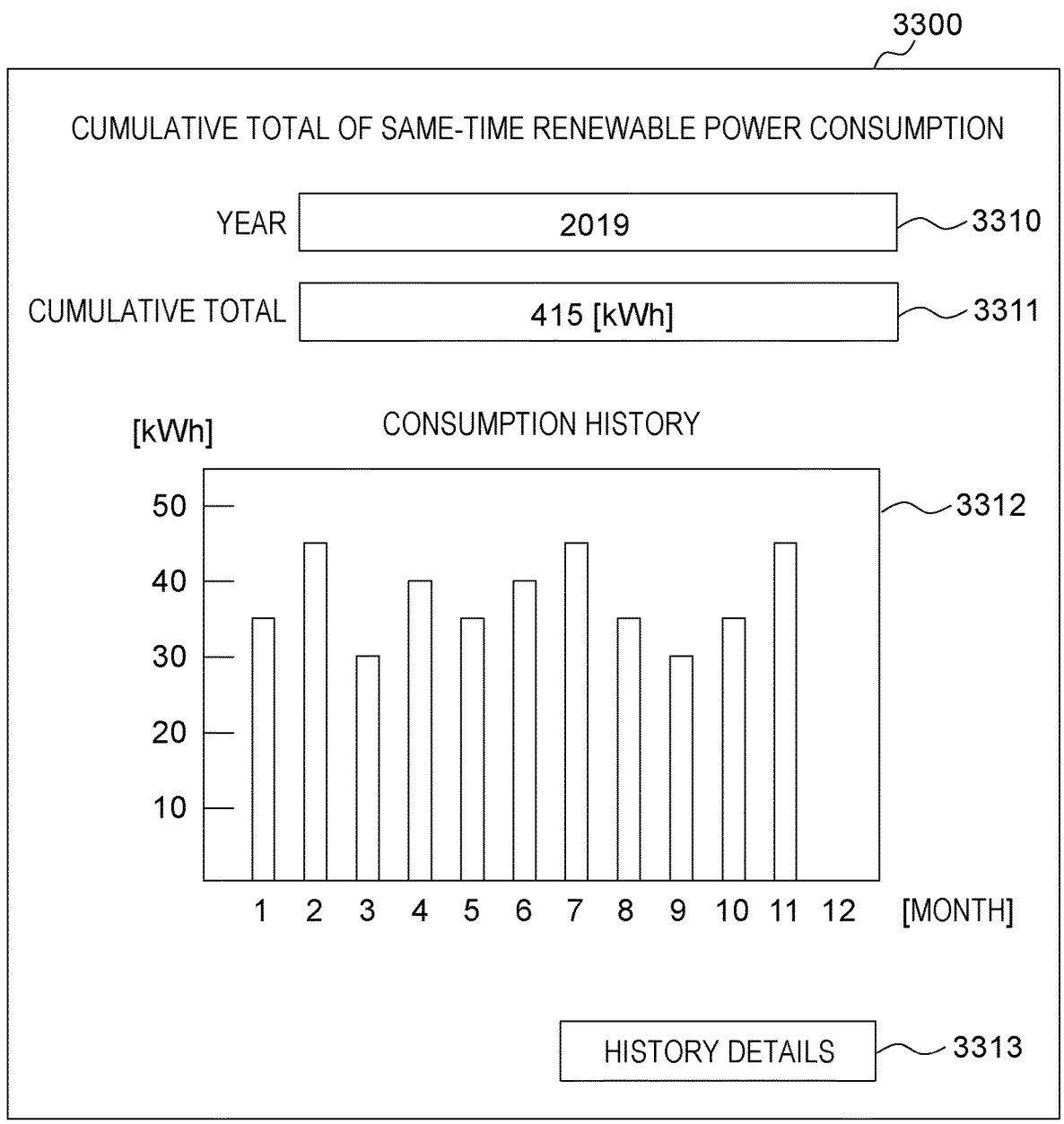
FIG. 33 is a view illustrating a display screen of same-time renewable power consumption history data by the power demand-supply management apparatus according to the sixth embodiment.

FIG. 33 is a view illustrating a display screen of same-time renewable power consumption history data by the power demand-supply management apparatus 30 according to the sixth embodiment. In the first embodiment, the power demand system 10 consumes, for example, same-time renewable power, and a content of a power transaction is managed by the power demand-supply management apparatus 30 and the distributed ledger system 60 each time. In the sixth embodiment, data indicating monthly history and cumulative total of same-time renewable power consumption is issued from the power demand-supply management apparatus 30 to the power demand system 10 every month.

Same-time renewable power consumption history data 3300 illustrated in FIG. 33 includes a year 3310 in which same-time renewable power is consumed, a cumulative total 3311 of consumed renewable power, consumption history 3312 of same-time renewable power in each month, and history details 3313 of same-time renewable power consumption. The sixth embodiment illustrates that the amount of consumed same-time renewable power until November 2019 is 415 kWh. When a content of the history details 3313 is confirmed, the detailed history for each same-time renewable power transaction can be confirmed.

The confirmation of the consumption history of the same-time renewable power has been described above. However, in a case where the power demand system selects same-time renewable power and another power, for example, normal power each time and consumes a plurality of types of power, display is performed with different colors such that the respective power consumption amounts can be seen. In addition, information on each consumption ratio with respect to the total power consumption is also provided. As described above, the power demand system 10 can manage the history of power consumption and the cumulative total of power consumption with respect to the consumed renewable power, same-time renewable power, normal power, and combinations thereof.

[1] A power management system according to an embodiment of the present invention is a power management system that manages a transaction of renewable power generated by RE meaning renewable energy, and can be summarized as follows. The power management system includes a renewable power supply system 50 capable of supplying the renewable power generated based on the renewable energy RE to a power demand system 10, and a power demand-supply management apparatus 30 that manages demand and supply of power. The power demand-supply management apparatus 30 requests the renewable power supply system 50 to supply power to the power demand system 10 in a power generation time zone, and issues, to the power demand system 10, a certificate that the amount of supplied power has been consumed in accordance with generation of renewable power.

First, a basic mode of issuing a same-time renewable source certificate 700 when there is no charge/discharge function and renewable power is consumed in real time is defined. The power demand system 10 consumes power. If there is a demand request for same-time renewable power in a renewable power generation time zone, the power demand-supply management apparatus 30 requests the renewable power supply system 50 to supply the renewable power in response to the request. At this time, the power demand-supply management apparatus 30 causes the renewable power supply system 50 to supply the renewable power, issues the same-time renewable source certificate 700 corresponding to the amount of supplied renewable power, and provides the same-time renewable source certificate 700 to the power demand system 10.

As a result, a buyer forming the power demand system 10 or a proxy thereof obtains a benefit that the reception of the same-time renewable source certificate 700 serves as a certificate of social contribution. The same-time renewable source certificate 700 that is beneficial also serves as a transaction material. Thus, the power demand-supply management apparatus can contribute to the society by counting an environmental value of the power generated by RE and encouraging the power to be consumed in the same time zone.

[2] With respect to the above basic mode [1], it is preferable that the power management system further include the renewable power supply system 50, the power demand-supply management apparatus 30, a power service system 20, the power demand system 10, a power network 120, and a communication network 110.

The renewable power supply system 50 can supply the renewable power generated by RE. The power demand-supply management apparatus 30 manages the demand and supply of power. The power service system 20 manages a power supply service. The power demand system 10 consumes power. The power network 120 transmits power among the renewable power supply system 50, the power service system 20, and the power demand system 10. The communication network 110 provides communication among the renewable power supply system 50, the power demand-supply management apparatus 30, the power service system 20, and the power demand system 10.

The power service system 20 can issue the same-time renewable source certificate 700 that certifies consumption of renewable power at the same time as generation of the renewable power. The power service system 20 requests same-time renewable power from the power demand-supply management apparatus 30 based on a demand request for the same-time renewable power from the power demand system 10. In response to the request, the power demand-supply management apparatus 30 requests the renewable power supply system 50 to supply the renewable power in the renewable power generation time zone.

Information regarding the various requests described above is instantaneously transmitted by the communication function of the communication network 110 among the power demand-supply management apparatus 30, the power demand-supply management apparatus 30, the power service system 20, and the power demand system 10. The power management system of the above mode [2] can guide the power demand system 10 to consume the renewable power without delay at the same time when the renewable power supply system 50 generates the renewable power due through its solid function.

[3] With respect to the above basic mode [2], it is preferable to consider a case where normal power is requested in spite of a state where power generation based on renewable energy is possible. The power management system of the mode [3] may supply the renewable power against a request from a buyer, and can also issue a corresponding renewable source certificate 600 in conjunction therewith, but hold the renewable source certificate 600 in an issuer without passing the renewable source certificate 600 to the buyer. In this case, the power demand-supply management apparatus 30 can also issue the renewable source certificate 600 indicating the renewable power. In this manner, when the supply of normal power is requested in spite of the renewable power generation time zone, the power management system of the mode [3] supplies the renewable power from the renewable power supply system 50 and issues the renewable source certificate 600 corresponding to the amount of supplied power, but holds the renewable source certificate 600 in the issuer without distributing the renewable source certificate 600. Specifically, it is practical to use fossil fuel-derived power that compensates for a shortage due to the influence of bad weather even if aiming to use the same-time renewable power. Even in such a case, an application range of the present invention can be expanded, and the same-time renewable power certificate can be issued in accordance with a power buyer's choice.

[4] With respect to the above mode [3], the renewable source certificate 600 held as the normal power may be supplied when renewable power is requested in a state where power generation based on renewable energy is impossible. The power management system of the mode [4] further includes a normal power supply system 40 connected to the power network 120 and the communication network 110. When the supply of the renewable power is requested in spite of the time zone in which the renewable power generation is not possible, the power demand-supply management apparatus 30 according to the mode [4] controls to supply the normal power from the normal power supply system 40, and provides the power demand system 10 with the renewable source certificate 600 held like savings in response to the amount of supplied power.

[5] With respect to the above basic mode [2], it is preferable to provide a charge/discharge function for charging of renewable power as described in the second embodiment. The power management system of the mode [5] further includes a charge/discharge system 70 connected to the power network 120 and the communication network 110. When determining that there is a margin for charging of the renewable power supplied from the renewable power supply system 50 in the renewable power generation time zone, the power demand-supply management apparatus 30 in the mode [4] charges the charge/discharge system 70 with the supplied renewable power. The power management system of the mode [5] can contribute to the limit on the maximum power consumption and can save the generation amount of new normal power.

[6] With respect to the above basic mode [5], when the same-time RE is requested in a state where the power generation based on renewable energy is not possible, the charged power may be discharged, and the same-time renewable source certificate 700 may be provided. When the supply of the same-time renewable power is requested in spite of a time zone in which the renewable power generation is not possible, the power demand-supply management apparatus 30 according to the mode [6] discharges the renewable power charged in the charge/discharge system 70 to supply the renewable power, and provides the power demand system 10 with the same-time renewable source certificate 700 in response to the supplied power. The power management system of the mode [6] can certify that the generation amount of the new normal power has been saved by the same-time renewable source certificate 700.

[7] It is sufficient for the power demand-supply management apparatus 30 realizing the above mode [6] to be capable of issuing the same-time renewable source certificate 700. The same-time renewable source certificate 700 of the mode [7] preferably includes one or more lists of combinations of a time zone in which power has been supplied and the amount of supplied renewable power.

[8] The same-time renewable source certificate 700 realizing the above mode [7] may be issued in a divided manner. Since a charging amount and a discharging amount of the renewable power in the charge/discharge system 70 do not have a property of matching with each other, a certificate in a divided unit is issued.

[9] It is preferable that the power management system realizing the above mode [7] further include a distributed ledger system 60 connected to the communication network 110. The power demand-supply management apparatus 30 in the mode [9] may record a content of a power transaction in the distributed ledger system 60.

[10] In the power management system realizing the above mode [9], it is sufficient for the power demand-supply management apparatus 30 to provide the power demand system 10 with any one of history information and cumulative total information or both the information regarding consumption of any one or both of renewable power and same-time renewable power. According to the power management system of the mode [10], the renewable power is preferentially consumed as much as possible, and the consumption of the same-time renewable power is encouraged if possible.

[11] A basic power demand-supply management apparatus 30 that issues a same-time renewable source certificate 700 is an apparatus that manages demand and supply of power by a controller provided with a CPU 1301 and a storage 1303, and supplies the generated renewable power and issues the same-time renewable source certificate 700 for the amount of the supplied renewable power in a case where same-time renewable power is requested when power generation based on renewable energy is performed. As a result, the consumption of the same-time renewable power is encouraged.

[12] The power demand-supply management apparatus 30 realizing the above mode [11] discharges and supplies charged renewable power if the charged renewable power exists, and issues the same-time renewable source certificate 700 in response thereto. In a case where the same-time renewable power is requested when power generation based on renewable energy is not performed, the power demand-supply management apparatus 30 of the mode [12] discharges the charged renewable power to supply the renewable power, and issues the same-time renewable source certificate 700 for the amount of supplied renewable power. The power management system of the mode [12] can certify that the generation amount of the new normal power has been saved by the same-time renewable source certificate 700 even when the power generation based on renewable energy is not performed.

[13] The power demand-supply management apparatus 30 realizing the above mode [12] preferably records a power transaction. The power demand-supply management apparatus 30 of the mode [13] records power generation source information of renewable power, consumption destination information of the renewable power, the amount of consumed renewable power, and information on the same-time renewable source certificate 700 issued for the amount of the consumed renewable power. As a result, it is possible to contribute to the society by encouraging the consumption of the same-time renewable power.

[14] A basic power demand-supply management method for issuing a same-time renewable source certificate 700 is a method for managing supply and demand of power by a controller provided with a CPU 1301 and a storage 1303 according to a procedure of supplying generated renewable power and issuing the same-time renewable source certificate 700 for the amount of the supplied renewable power in a case where same-time renewable power is requested when power generation based on renewable energy is performed. As a result, it is possible to contribute to the society by encouraging the consumption of the same-time renewable power.

[15] In the power demand-supply management method for realizing the above mode [14], a power transaction may be recorded. The power demand-supply management method according to the mode [15] may be executed by a procedure in which charged renewable power is discharged to supply the renewable power, and the same-time renewable source certificate 700 is issued for the amount of the supplied renewable power in a case where same-time renewable power is requested when the power generation based on renewable energy is not performed. As a result, it is possible to contribute to the society by encouraging the consumption of the same-time renewable power.

What is claimed is:

1. A power management system that manages a transaction of power generated based on renewable energy (RE), the power management system comprising:
   a renewable power supply system capable of supplying renewable power generated based on the RE to a power demand system; and
   a normal power supply system connected to the power network and the communication network,
   a power demand-supply management apparatus that manages demand and supply of the power,
   a power network that transmits power among the renewable power supply system, the normal power supply system, and the power demand system,
   a communication network that provides communication among the renewable power supply system, the normal power supply system, the power demand-supply management apparatus, and the power demand system, wherein the power demand-supply management apparatus is capable of issuing a renewable source certificate indicating renewable power, in response to a request for supply of normal power in a renewable power generation time zone, requests the renewable power supply system to supply the renewable power to the power demand system, and issues and holds the renewable source certificate corresponding to an amount of supplied power, and in response to a request for supply of renewable power in a time zone in which renewable power generation is not possible, controls to supply the normal power from the normal power supply system, adds information of a system that has consumed the supplied normal power to the held renewable certificate, and provides the power demand system with the held renewable source certificate.

2. The power management system according to claim 1, further comprising:

a power service system that manages a power supply service;

wherein the power service system is connected to the power network and the communication network, is capable of issuing a same-time renewable source certificate indicating that renewable power has been consumed at a same time as generation of the renewable power, and requests same-time renewable power to the power demand-supply management apparatus based on a demand request for the same-time renewable power from the power demand system.

3. The power management system according to claim 2, further comprising a charge/discharge system connected to the power network and the communication network, wherein, when determining that there is a margin for charging of renewable power supplied from the renewable power supply system in a renewable power generation time zone, the power demand-supply management apparatus charges the charge/discharge system with supplied renewable power.

4. The power management system according to claim 3, wherein when supply of same-time renewable power is requested in spite of a time zone in which renewable power generation is not possible, the power demand-supply management apparatus discharges the renewable power charged in the charge/discharge system to supply the renewable power, and provides the power demand system with a same-time renewable source certificate in response to supplied power.

5. The power management system according to claim 4, wherein the power demand-supply management apparatus is also capable of issuing the same-time renewable source certificate, and the same-time renewable source certificate includes a list of different combinations of a time zone in which power has been supplied and an amount of supplied renewable power.

6. The power management system according to claim 5 capable of issuing the same-time renewable source certificate in a divided manner.

7. The power management system according to claim 6, further comprising a distributed ledger system connected to the communication network, wherein the power demand-supply management apparatus records a content of a power transaction in the distributed ledger system.

8. The power management system according to claim 7, wherein the power demand-supply management apparatus provides the power demand system with any one of history information and cumulative total information or both information regarding consumption of renewable power at different times.

9. A power demand-supply management apparatus that manages demand and supply of power by a controller provided with a CPU and a storage, wherein the power demand-supply management apparatus in response to a request for supply of normal power in a renewable power generation time zone, supplies generated renewable power, and issues and holds a renewable source certificate corresponding to an amount of supplied renewable power, and in response to a request for supply of renewable power in a time zone in which renewable power generation is not possible, supplies generated normal power, and adds information of a system that has consumed the supplied normal power to the held renewable certificate.

10. The power demand-supply management apparatus according to claim 9, wherein power generation source information of renewable power, consumption destination information of the renewable power, an amount of the consumed renewable power, and information on the same-time renewable source certificate issued for the amount of the consumed renewable power are recorded.

11. A power demand-supply management method for managing demand and supply of power by a controller provided with a CPU and a storage, the power demand-supply management method comprising the steps of:

in response to a request for supply of normal power in a renewable power generation time zone, supplying generated renewable power, and issuing and holding a renewable source certificate corresponding to an amount of supplied power, and in response to a request for supply of renewable power in a time zone in which renewable power generation is not possible, supplying generated normal power, and adding information of a system that has consumed the supplied normal power to the held renewable certificate.

12. The power demand-supply management method according to claim 11, further comprising the steps of:

discharging charged renewable power to supply the renewable power, and issuing the same-time renewable source certificate for an amount of the supplied renewable power in a case where same-time renewable power is requested when the power generation based on renewable energy is not performed.

* * * * *